(12) United States Patent
Sompalli et al.

(10) Patent No.: US 11,316,144 B1
(45) Date of Patent: Apr. 26, 2022

(54) LITHIUM-ION BATTERIES WITH SOLID ELECTROLYTE MEMBRANES

(71) Applicant: Amazon Technologies, Inc., Seattle, WA (US)

(72) Inventors: Bhaskar Sompalli, Fremont, CA (US); Yuting Yeh, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 64 days.

(21) Appl. No.: 16/521,277

(22) Filed: Jul. 24, 2019

Related U.S. Application Data

(63) Continuation-in-part of application No. 16/296,845, filed on Mar. 8, 2019.

(60) Provisional application No. 62/779,053, filed on Dec. 13, 2018.

(51) Int. Cl.
| | |
|---|---|
| *H01M 4/1391* | (2010.01) |
| *H01M 10/0525* | (2010.01) |
| *H01M 4/62* | (2006.01) |
| *H01M 50/116* | (2021.01) |
| *H01M 4/02* | (2006.01) |

(52) U.S. Cl.
CPC ......... *H01M 4/1391* (2013.01); *H01M 4/623* (2013.01); *H01M 10/0525* (2013.01); *H01M 50/116* (2021.01); *H01M 2004/028* (2013.01)

(58) Field of Classification Search
None
See application file for complete search history.

(56) References Cited

U.S. PATENT DOCUMENTS

| | | | |
|---|---|---|---|
| 5,728,489 A | * | 3/1998 | Gao ............... H01M 10/052 429/309 |
| 8,533,803 B2 | | 9/2013 | Cha et al. |
| 8,539,567 B1 | | 9/2013 | Logue et al. |
| 8,635,373 B1 | | 1/2014 | Supramaniam et al. |

(Continued)

OTHER PUBLICATIONS

Wirtz Hanno et al. CA-Fi; Ubiquitous Mobile wireless without 802.11 Overhead and Restrictions 2014 Proceeding of IEEE (year 2014); 9 pgs.

(Continued)

*Primary Examiner* — Carmen V Lyles-Irving
(74) *Attorney, Agent, or Firm* — Eversheds Sutherland (US) LLP

(57) ABSTRACT

Systems, methods, and computer-readable media are disclosed for lithium-ion batteries with solid electrolyte membranes. In one embodiment, a battery cell may include a copper current collector, a first layer in contact with the copper current collector, the first layer comprising polyvinylidene fluoride, an anode comprising a first lithiated polymer binder configured to conduct lithium ions, where the first layer is disposed between the copper current collector and the anode, and a lithiated polymer electrolyte membrane in contact with the anode. The battery cell may include a cathode in contact with the lithiated polymer electrolyte membrane and comprising a second lithiated polymer binder configured to conduct lithium ions, a second layer in contact with the cathode, the second layer comprising polyvinylidene fluoride, and an aluminum current collector disposed adjacent to the second layer, wherein the aluminum current collector is a positive current collector.

19 Claims, 14 Drawing Sheets

(56) References Cited

U.S. PATENT DOCUMENTS

| | | |
|---|---|---|
| 8,949,968 B2 | 2/2015 | Wei et al. |
| 9,009,805 B1 | 4/2015 | Kirkby et al. |
| 10,230,522 B1 | 3/2019 | Roths et al. |
| 10,484,770 B1 | 11/2019 | Rao et al. |
| 10,644,880 B1 | 5/2020 | Roths et al. |
| 10,924,834 B1 | 2/2021 | Rao et al. |
| 2002/0135294 A1 | 9/2002 | Fijishiro et al. |
| 2003/0125959 A1 | 7/2003 | Palmquist |
| 2004/0067417 A1* | 4/2004 | Oosawa ............ H01M 10/0585 429/210 |
| 2004/0103153 A1 | 5/2004 | Chang et al. |
| 2006/0044746 A1 | 3/2006 | Kim et al. |
| 2006/0277049 A1 | 12/2006 | Huang |
| 2008/0254278 A1* | 10/2008 | Sethumadhavan ... H01M 2/166 428/315.5 |
| 2008/0263363 A1 | 10/2008 | Jueneman et al. |
| 2009/0041283 A1 | 2/2009 | Ishibashi et al. |
| 2009/0055514 A1 | 2/2009 | Tebbs et al. |
| 2009/0254750 A1 | 10/2009 | Bono et al. |
| 2009/0274333 A1 | 11/2009 | Lan et al. |
| 2009/0316056 A1 | 12/2009 | Rosencwaig et al. |
| 2010/0246877 A1 | 9/2010 | Wang et al. |
| 2011/0001706 A1 | 1/2011 | Sanford et al. |
| 2012/0224299 A1 | 9/2012 | Myers et al. |
| 2012/0300969 A1 | 11/2012 | Tanaka et al. |
| 2013/0048837 A1 | 2/2013 | Pope et al. |
| 2013/0227291 A1 | 8/2013 | Ahmed et al. |
| 2014/0241551 A1 | 8/2014 | Kim et al. |
| 2014/0272561 A1* | 9/2014 | Huang .................... H01M 4/74 429/211 |
| 2014/0341417 A1 | 11/2014 | McGarry et al. |
| 2015/0053497 A1 | 2/2015 | Horiuchi |
| 2015/0092334 A1 | 4/2015 | Hayashida et al. |
| 2015/0188949 A1 | 7/2015 | Mahaffey et al. |
| 2015/0195635 A1 | 7/2015 | Garfio et al. |
| 2015/0318998 A1 | 11/2015 | Erlikhman et al. |
| 2016/0197352 A1* | 7/2016 | Blaser ................. H01M 4/1395 429/217 |
| 2016/0264443 A1 | 9/2016 | Matsumoto et al. |
| 2016/0345086 A1 | 11/2016 | Chamberlin et al. |
| 2017/0242478 A1 | 8/2017 | Ma |
| 2018/0084323 A1 | 3/2018 | Luce et al. |
| 2018/0174584 A1 | 6/2018 | Chih et al. |
| 2018/0219976 A1 | 8/2018 | Decenzo et al. |
| 2019/0069078 A1 | 2/2019 | Johnson et al. |
| 2019/0165430 A1* | 5/2019 | Maresh ............... H01M 10/445 |
| 2019/0173125 A1* | 6/2019 | Lanning ................ H01M 4/386 |
| 2019/0267628 A1 | 8/2019 | Yadav |
| 2020/0083509 A1* | 3/2020 | Herrmann ........... H01M 2/1686 |

OTHER PUBLICATIONS

Korba, Larry Security System for Wireless local area networks. Ninth IEEE (1998); 8 pgs.

Antonious, Josephina et al. Cooperation among Access Points for Enhances Quality of Service in Dense Wireless Environments. 2014 Proceeding of IEEE International Symposium on a World of Wireless, Mobile and Multimedia Networks. https://ieeexplore.ieee.org/stamp/stamp.jsp?tp=&arnumber=6918953 (Year 2014); 6 pgs.

Fremantle, Paul et al. Federated Identity and Access Management for the Internet of Things. 2014 International Workshop on Secure Internet of Things, https://ieeexplore.ieee.org/stamp/stamp.jsp?tp=&arnumber=7058903 (Year 2014); 8 pgs.

Datta, Soumya Kanti, Towards Security Discovery Services in Internet of Things. 2016 IEEE International Conference an Consumer Electronic (ICCE). https://ieeexplore.ieee.org/stamp/stamp.jsp?tp=&arnumber=7430707 (Year 2016); 2 pgs.

Zafari, Faheem et al. Microlocation for Internet-of-Things-Equipped Smart Buildings. IEEE Internet of Things Journal, vol. 3, Issue: 1. https://ieeexplore.org/stamp/stamp.jsp?tp=&arnumber=7120085 (Year 2016); 17 pgs.

* cited by examiner

LITHIUM-ION BATTERIES WITH SOLID ELECTROLYTE MEMBRANES

CROSS-REFERENCE TO RELATED APPLICATION

This application is a continuation-in-part of U.S. application Ser. No. 16/296,845, filed Mar. 8, 2019, which claims the benefit of U.S. Provisional Application No. 62/779,053, filed Dec. 13, 2018, both of which are incorporated by reference in their entirety.

BACKGROUND

Electronic devices may include batteries or other portable power sources. Certain batteries may be subject to swelling, expanding, or otherwise changing form over time, and may include flammable elements. For example, a pouch battery may swell in the event that the pouch battery is damaged. Swollen or expanded batteries may cause damage to a device, such as causing a device housing to expand, a device screen to crack, or other damage. In some instances, swollen or otherwise damaged batteries may create a safety hazard for users. Accordingly, preventing swelling or other changes in form of batteries, and reducing safety risks associated with batteries, may be desired.

Figure 1:
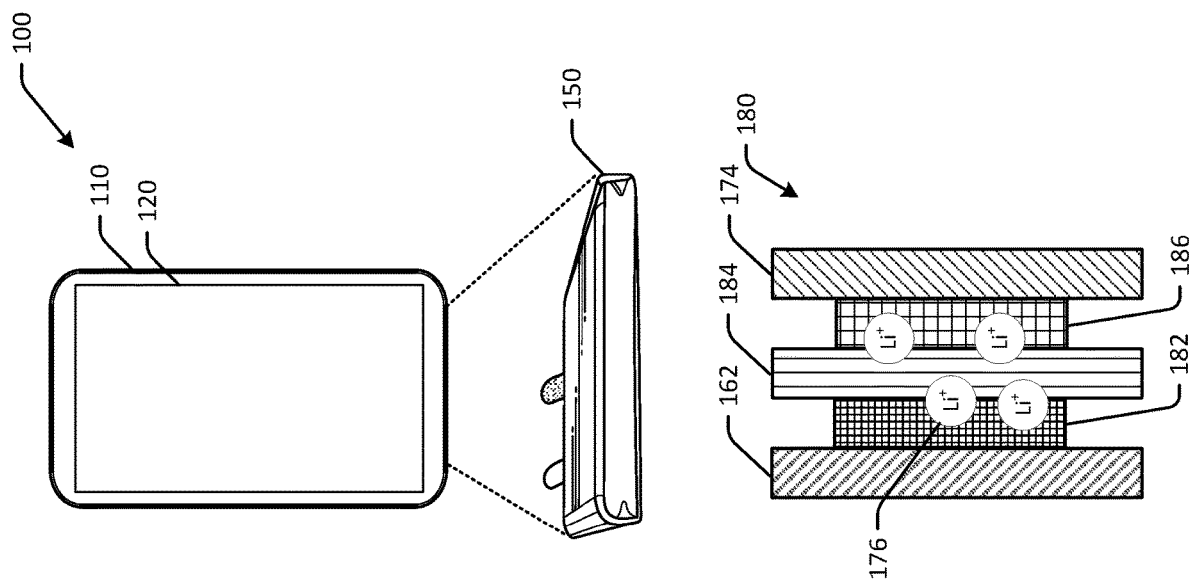
FIG. 1 is a schematic illustration of an example use case of a lithium-ion battery with solid electrolyte membrane in accordance with one or more embodiments of the disclosure.
Figure 1:
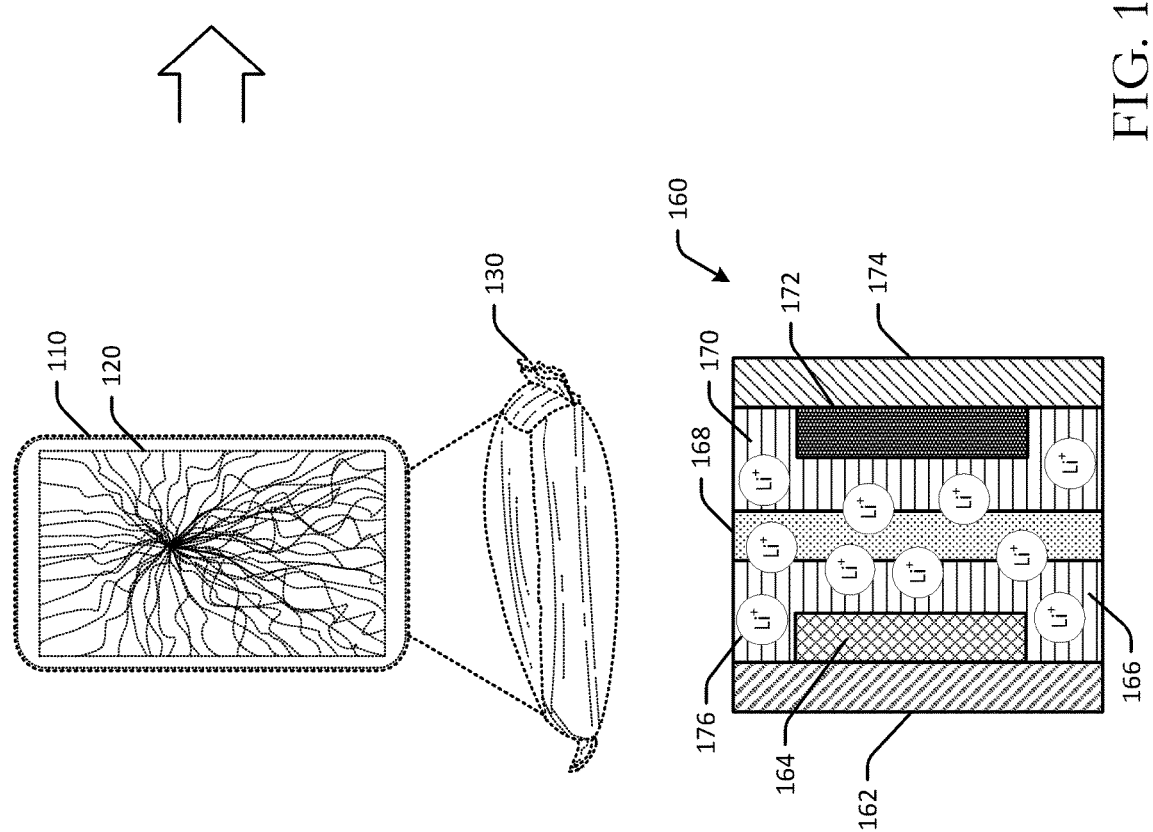

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content. Some electronic devices may be portable and may include portable power sources, such as batteries and the like. The batteries or power sources may be rechargeable. Batteries used in electronic devices may have various form factors. For example, some batteries may be pouch batteries, some batteries may be cylindrical batteries, some batteries may be cells or packs, and so forth. Batteries may be removably positioned in some devices, while it other devices batteries may be positioned in fixed locations or may otherwise be embedded, non-removable and/or non-replaceable in a device.

The location of a battery or power source in a device may be dimensioned so as to accommodate a particular battery form factor and/or size. Accordingly, any changes to a form factor and/or size of a battery may result in strains or stresses imparted on other components of the device. For example, if a pouch battery expands or swells from its initial form factor, the expanded or swollen battery may impart a strain on a display of the device. If the pouch battery expands or swells enough, the display and/or other components of the device may be damaged. For example, the display may crack or shatter, the device housing may expand, components of the device may become lose, and the like. While certain batteries may be designed to accommodate a small amount of swelling, such as 10% swelling in a Z-direction or thickness of a pouch battery, such batteries may be unprotected against abnormal swelling or bulge situations, which could be caused, in one example, by gas swelling.

In addition to deformation, certain batteries may include flammable components, which may create safety risks in the event of leakage or other damage to a battery. One example of a cause of low battery performance and/or battery safety issues includes electrolyte degradation. For example, batteries that include liquid electrolyte may be more flammable than batteries that do not include liquid electrolyte, as the electrolyte itself may be flammable. For example, electrolyte materials may degrade at high battery voltages, such as voltages greater than 4 volts at the cathode, leading to battery performance loss and/or swelling due to gassing. The degradation, combined with the electrolyte flammability, exacerbates the safety risks for aging batteries.

A battery may be a single cell, multiple cells, a pack, and the like, and may be referred to herein as a "cell." Certain batteries or power sources, such as pouch batteries, may expand or swell as a result of damage to one or more components of the battery. For example, electrolyte degradation or breakdown may cause swelling as a result of gas generated by the breakdown. In another example, if one or more layers of a battery pouch are damaged and/or come into contact with electrochemical components of the cell, the layers (e.g., the pouch aluminum layer, etc.) may corrode, which may weaken the pouch structure and result in expansion or swelling of the pouch battery. The expansion or swelling may cause damage to the device and/or create a safety hazard or a perceived safety hazard to a user of the device.

Embodiments of the disclosure include batteries with solid electrolyte membranes that may include little or no liquid electrolyte, and may therefore be resistant to damage, such as swelling. Certain embodiments may be resistant to flammability or other catastrophic failure. Some embodiments may be corrosion-resistant. Embodiments may prevent swelling or damage to components of a battery, such as a pouch material, even in the event of damage to one or more components of the battery. For example, damage to a pouch of the battery may have reduced impact as less or no liquid electrolyte may be released from the battery. Batteries of the disclosure may be any suitable battery that is susceptible to packaging corrosion and/or batteries with failure modes that include swelling, such as a lithium-ion battery, or any other suitable battery type, and may have exterior pouches, casings, or housings comprised of any suitable material.

This disclosure relates to, among other things, systems, methods, computer-readable media, techniques, and methodologies for lithium-ion batteries with solid electrolyte membranes. Embodiments may include batteries with solid electrolyte membranes that may include certain materials, such as lithiated Nafion. Such embodiments may maintain battery performance, while preventing premature drainage or exhaustion of the battery.

Referring to FIG. 1, an example environment 100 with a device 110 is illustrated in accordance with one or more embodiments of the disclosure. The device 110 may be any suitable portable device, such as a smartphone, an e-reader, a tablet, an audio or video streaming device, an Internet of Things (IoT) device, a product ordering button or device, a home sensor, an aging in place device, an earphone, a speaker device, or another device. In the example of FIG. 1, the device 110 may be a smartphone with a display 120. Two instances are illustrated in FIG. 1. In a first instance, the device 110 may include a first pouch battery 130 positioned within the device 110, such as within a housing of the device 110. The first pouch battery 130 may power the device 110. In a second instance, the device 110 may include a second pouch battery 150 positioned within the device 110, such as within a housing of the device 110. The second pouch battery 150 may power the device 110.

As illustrated in FIG. 1, the first pouch battery 130 may be a typical lithium-ion battery that is susceptible to damage and flammability. As a result, in some instances, the first pouch battery 130 may expand and damage the device 110. In contrast, the second pouch battery 150 may be a lithium-ion battery with a solid electrolyte membrane, as described herein, and may therefore be resistant to electrolyte degradation, and as a result, resistant to damage and flammability.

Both the first pouch battery 130 and the second pouch battery 150 may include a pouch that forms a housing or outer casing of the respective pouch battery 130. The pouch may be formed of a polymer, aluminum, or other material. The pouch may be flexible, so as to allow for flexibility in positioning of the respective pouch battery in the device 110.

The first pouch battery 130 may include one or more cells, such as lithium-ion cells. The lithium-ion cells may include a number of components. For example, a first lithium-ion cell 160 in the first pouch battery 130 may include a copper anode current collector 162, an anode 164 formed of graphite and polyvinylidene fluoride (PVDF) binder positioned adjacent to the copper anode current collector 162, a porous polyethylene separator 168, a cathode 172 formed of lithium cobalt oxide and PVDF binder, and an aluminum cathode current collector 174 positioned adjacent to the cathode 172. The first lithium-ion cell 160 may include liquid electrolyte 166, 170, that may fill space between the copper anode current collector 162 and the aluminum cathode current collector 174 (where liquid electrolyte 166 represents liquid electrolyte at a first side of the porous polyethylene separator 168, and liquid electrolyte 170 represents liquid electrolyte at a second side of the porous polyethylene separator 168). The liquid electrolyte 166, 170, may flow through the porous polyethylene separator 168. The electrolyte 166, 170 may include lithium salts, organic solvents, additives, and other components. During charging and/or discharging, lithium ions may move between the anode 164 and the cathode 172 via the liquid electrolyte 166, 170. The cell may be at least partially positioned within the pouch of the pouch battery, and may be a lithium-ion cell, a lithium-polymer cell, or another cell type.

In first pouch battery 130, the electrolyte 166, 170 may include non-aqueous solvents and lithium-containing salt, and serves as the vehicle for ion movement. The wettability of the separator 168 and the electrodes 164, 172 defines how much of the electrodes are accessible by the electrolyte, which further defines the capacity of the cell. If there are regions in the separator and/or electrodes that are cut off from the electrolyte, those regions do not participate in the cell reactions and contribute to a lowered capacity. Furthermore the electrolyte degrades at high cathode voltages (e.g., greater than 4.0 volts, etc.) and temperatures higher than 50 degrees Celsius, leading to battery swelling and severe battery performance degradation.

In contrast, the second pouch battery 150 may include one or more cells, such as lithium-ion cells. The lithium-ion cells may include a number of components. For example, a second lithium-ion cell 180 in the second pouch battery 150 may include a copper anode current collector 162 (which may be the same as the first pouch battery 130), an anode 182 formed of graphite (or any other suitable material, such as lithium metals, niobium oxide, etc.) and lithiated Nafion binder positioned adjacent to the copper anode current collector 162, a lithiated solid polymer electrolyte Nafion membrane 184, a cathode 186 formed of lithium cobalt oxide and lithiated Nafion binder, and an aluminum cathode current collector 174 (which may be the same as the first pouch battery 130) positioned adjacent to the cathode 186.

The lithiated solid polymer electrolyte Nafion membrane 184 may act as the separator for the second lithium-ion cell 180. The second lithium-ion cell 180 may not include, or may be devoid of, any liquid electrolyte or free/unabsorbed liquid electrolyte. In some embodiments, air that fills space between the copper anode current collector 162 and the aluminum cathode current collector 174 may be vacuumed out of the pouch. During charging and/or discharging, lithium ions may move between the anode 164 and the cathode 172 via the lithiated Nafion. The cell may be at least partially positioned within the pouch of the pouch battery, and may be a lithium-ion cell, a lithium-polymer cell, or another cell type. Although different amounts of lithium-ions are illustrated in the drawings of the first lithium-ion cell 160 and the second lithium-ion cell 180, the same number of lithium-ions may be present in either cell.

Nafion may be a sulfonated tetrafluoroethylene based fluoropolymer-copolymer and may be classified as a synthetic polymer with ionomers. Nafion may be in powder or liquid form. Lithiated Nafion may be Nafion that has been contacted with lithium, such that lithium is incorporated into its chemical structure.

A binder may be a binding agent that holds or draws materials together to form a whole. In some instances, a binder may act as a chemical adhesive to form, for example, an electrode. A lithiated Nafion binder may be a binder that is formed at least partially of lithiated Nafion. Lithiated Nafion binders may be in liquid or solid form, and may be dried or otherwise cured into a solid or gel form. Lithiated Nafion binders may be configured to conduct lithium ions during charging and/or discharging of a cell.

A lithiated solid polymer electrolyte Nafion membrane may be a membrane that is a solid polymer electrolyte, where the solid polymer electrolyte is lithiated Nafion. In some embodiments, lithium ions may be dispersed in the Nafion upon lithiation to form the lithiated Nafion, which may then be used as the solid polymer electrolyte. The lithiated solid polymer electrolyte Nafion membrane may be configured to conduct lithium ions during charging and/or discharging of a cell. In some embodiments, instead of a lithiated solid polymer electrolyte Nafion membrane, a membrane may be formed using a porous composite material, such as a GORETEX® fuel cell membrane or other lithiated material, that can be soaked in lithiated Nafion liquid or powder to absorb the lithiated Nafion. The resultant material may be about 50% to about 70% porous material, and about 30% to about 50% lithiated Nafion. Such composite materials may be of relatively less cost than other lithiated solid polymer electrolyte Nafion membranes.

Accordingly, certain embodiments, such as the second pouch battery 150, may include a battery having a package, such as a pouch, and at least one cell positioned within the package. The at least one cell may include the anode 182, a lithiated polymer electrolyte membrane, such as the lithiated solid polymer electrolyte Nafion membrane 184 or a lithiated Nafion membrane, and the cathode 186. The lithiated polymer electrolyte membrane may be arranged between the anode and the cathode. The lithiated polymer electrolyte membrane may be configured to conduct lithium ions during charging and discharging.

The anode 162 may include a first lithiated polymer binder, such as a lithiated Nafion binder, that is configured to conduct lithium ions during charging and discharging. The cathode 186 may include a second lithiated polymer binder configured to conduct lithium ions during charging and discharging. The first lithiated polymer binder and the second lithiated polymer binder may be formed of the same lithiated polymer material (e.g., "first" and "second" are used to denote the specific binders being referenced, etc.), such as lithiated Nafion.

Embodiments of the disclosure include replacing the liquid electrolyte in lithium-ion batteries with a non-flammable lithium-ion conducting solid polymeric electrolyte separator. Embodiments of the disclosure may enhance battery life and reduce safety risk. Some embodiments may provide higher energy density batteries that thrive at high ambient temperatures up to 50 degrees Celsius. Certain embodiments may have similar or lower conductivity and cell resistance relative to conventional cells, and may demonstrate greater than 500 cycles at ambient temperatures of 25 degrees Celsius and still maintain greater than 80% of initial capacity at 1C charge and 1C discharge rate. Certain embodiments may demonstrate greater than 200 cycles at ambient temperatures of 60 degrees Celsius, and still maintain greater than 80% of initial capacity at 1C charge and discharge rate. Certain embodiments may demonstrate greater than 200 cycles at greater than 4.5V cell voltage at 25 degrees Celsius. Certain embodiments may have similar or better energy density (Wh/L and Wh/kg) as that of a conventional cell of same electrode size. Certain embodiments may be the same cost or cheaper than conventional cell of same electrode size. Certain embodiments may include a Nafion cell-making process that is a drop-in replacement to conventional battery-making process. Some embodiments may use a robust cation ($Li^+$) conducting solid polymeric membrane, to replace the liquid/gel electrolyte+ porous polyethylene separator combination that is used in conventional cells.

The second pouch battery 150 may therefore use Nafion as an electrolyte separator and as the binder. Because Nafion is an excellent ion-transport membrane, electrolyte use may be reduced by about 70%, or may be completely eliminated. The lithium ions shuttle between the electrodes using the Nafion membrane separator and the Nafion binder as the pathway, instead of liquid electrolyte. To create Nafion as the binder, it is added to the anode and cathode paste during fabrication and then cast into electrodes. This seals in the Nafion distribution and eliminates the wettability-related performance issues seen in conventional batteries. Since the liquid electrolyte is significantly reduced or completely eliminated, the electrolyte degradation related issues are significantly reduced. Some embodiments may operate at temperatures up to 60 degrees Celsius without the accompanying safety and degradation risks.

Because the second lithium-ion cell 180 does not include liquid electrolyte or any free liquid electrolyte, the risk of electrolyte degradation is reduced, thereby reducing the risk of damage, such as swelling, of the second pouch battery 150 due to gas expansion and the like. As a result, the device 110 may not be impacted by issues caused by the second pouch battery 150.

Example embodiments of the disclosure provide a number of technical features or technical effects. For example, in accordance with example embodiments of the disclosure, certain embodiments of the disclosure may include batteries with solid electrolyte membranes that may include little or no liquid electrolyte. The batteries described herein may therefore prevent swelling and/or expansion of the battery, improve performance and/or stability of cells, and improve safety. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
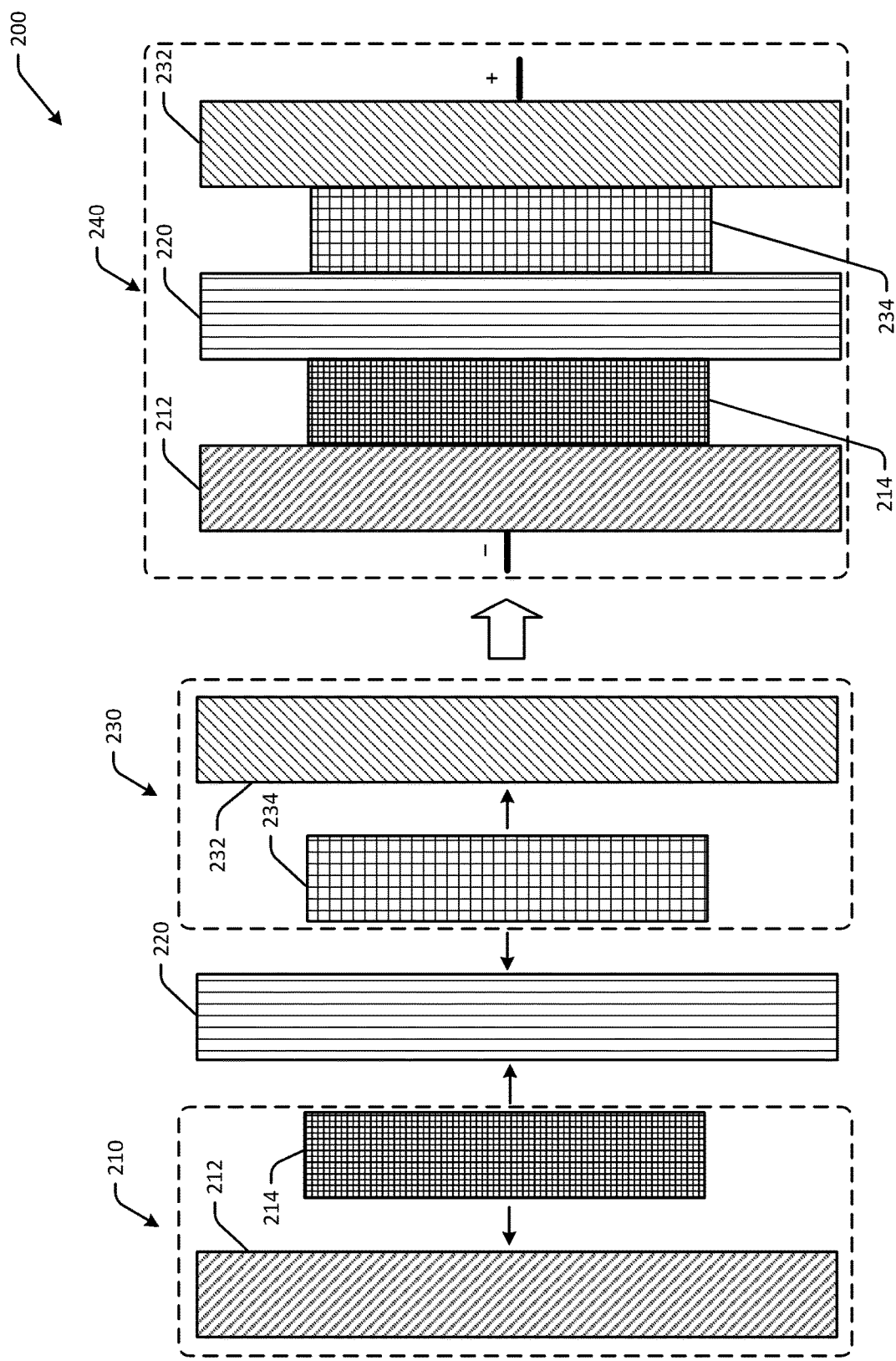
FIG. 2 is a schematic illustration of a cross-sectional view of a lithium-ion cell with a solid electrolyte membrane in accordance with one or more embodiments of the disclosure.

Referring to FIG. 2, a schematic drawing of a lithium-ion cell 200 with a solid electrolyte membrane is depicted in various cross-sectional views in accordance with one or more embodiments of the disclosure. Other embodiments may include additional or fewer components.

The lithium-ion cell 200 may be part of a lithium-ion battery. For example, a lithium-ion battery may include one or more lithium-ion cells 200. The lithium-ion cell 200 may be disposed in a pouch, such as in an interior portion of a flexible or rigid battery pouch, or other suitable package. In some embodiments, the lithium-ion cell 200 may be part of a lithium-ion pouch battery.

In FIG. 2, the lithium-ion cell 200 may include a first assembly 210, a lithiated Nafion membrane 220, and a second assembly 230. The lithiated Nafion membrane 220 may be a lithiated solid polymer electrolyte Nafion membrane. The first assembly 210 may be coupled to a first side of the lithiated Nafion membrane 220, and the second assembly 230 may be coupled to a second side, or opposite side, of the lithiated Nafion membrane 220. The first assembly 210 may include more than one component and may be formed or assembled prior to coupling with the lithiated Nafion membrane 220. The second assembly 230 may similarly include more than one component and may be formed or assembled prior to coupling with the lithiated Nafion membrane 220. In other instances, one or more, or all, components of the lithium-ion cell 200 may be formed or otherwise assembled at the same time.

The first assembly 210 may include a copper current collector 212 and an anode 214. The copper current collector 212 may be a negative current collector and/or may form a negative terminal of the battery. The copper current collector 212 may be disposed adjacent to the anode 214. In some instances, the copper current collector 212 may be in contact with the anode 214. The copper current collector 212 may form a first end of the lithium-ion cell 200. The anode 214 may be disposed adjacent to the copper current collector 212.

Figure 3:
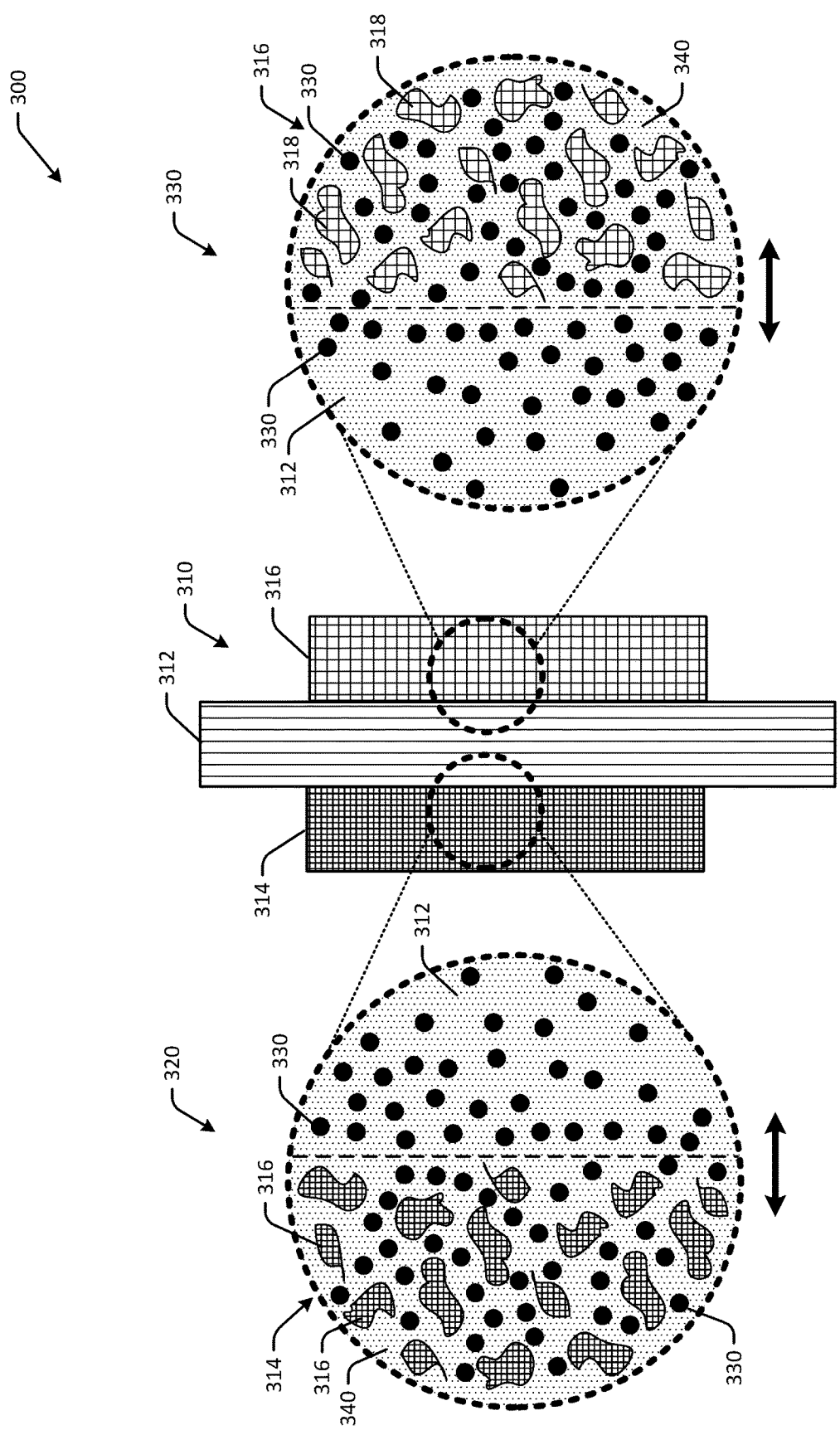
FIG. 3 is a schematic illustration of a cross-sectional view of a portion of a lithium-ion cell with detail views of lithium ion pathways in accordance with one or more embodiments of the disclosure.

The anode 214 may be formed of graphite and lithiated Nafion. For example, the anode 214 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 214, as illustrated in FIG. 3, during charging and discharging of the lithium-ion cell 200. Other embodiments may include a material other than, or in addition to, graphite, such as lithium metals, niobium oxide, etc.

The anode 214 may be coupled to the copper current collector 212. In some embodiments, the anode 214 may be laminated to the copper current collector 212, while in other embodiments, the anode 214 may be coupled to the copper current collector 212 using a heat and compress technique, a pressure-distribution sheet technique, or a different technique.

The lithiated Nafion membrane 220 may be configured to conduct lithium ions during charging and discharging of the lithium-ion cell 200. First lithium ion pathways in the anode 214 may extend from the lithiated Nafion membrane 220 to the copper current collector 212. Second lithium ion pathways in the cathode 234 may extend from the lithiated Nafion membrane 220 to the aluminum current collector 232.

The second assembly 230 may include an aluminum current collector 232 and a cathode 234. The aluminum current collector 232 may be a positive current collector and/or may form a positive terminal of the battery. The aluminum current collector 232 may be disposed adjacent to the cathode 234. In some instances, the aluminum current collector 232 may be in contact with the cathode 234. The aluminum current collector 232 may form a second end of the lithium-ion cell 200. The cathode 234 may be disposed adjacent to the aluminum current collector 232. The cathode 234 may be disposed between the lithiated Nafion membrane 220 and the aluminum current collector 232.

The cathode 234 may be formed of lithium cobalt oxide and lithiated Nafion. For example, the cathode 234 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 234, as illustrated in FIG. 3, during charging and discharging of the lithium-ion cell 200. The second lithium ion pathways may extend from the lithiated solid polymer electrolyte Nafion membrane to the aluminum current collector.

The cathode 234 may be coupled to the aluminum current collector 232. In some embodiments, the cathode 234 may be laminated to the aluminum current collector 232, while in other embodiments, the cathode 234 may be coupled to the aluminum current collector 232 using a heat and compress technique, a pressure-distribution sheet technique, or a different technique.

The first assembly 210 may be coupled to a first side of the lithiated Nafion membrane 220, and the second assembly 230 may be coupled to a second side of the lithiated Nafion membrane 220 to form a stack 240. For example, as illustrated in FIG. 2, the stack may include the lithiated Nafion membrane 220 disposed between the anode 214 and the cathode 234. The stack 234 may be formed using a pinch roller or other suitable technique. The stack 240 may be placed into a pouch or other package for use in a battery. Additional methods of manufacturing are discussed with respect to FIG. 6.

FIG. 3 is a schematic illustration of a cross-sectional view of a portion 310 of a lithium-ion cell 300, which may be a membrane electrode assembly, with detail views of lithium ion pathways in accordance with one or more embodiments of the disclosure. Other embodiments may include additional or fewer components. The lithium-ion cell 300 may be the same lithium-ion cell discussed with respect to FIG. 2.

In FIG. 3, an anode 314 is depicted adjacent to, and in contact with, a first side of a lithiated Nafion membrane 312, and a cathode 316 is depicted adjacent to, and in contact with, a second side of the lithiated Nafion membrane 312. As discussed with respect to FIG. 2, the anode 314 may include graphite that is dispersed in a first lithiated Nafion binder.

In a first detail view 320 of an interface between the anode 314 and the lithiated Nafion membrane 312, graphite particles 316 are illustrated as dispersed in a first lithiated Nafion binder 340. The graphite particles 316 may be dispersed and held together or bound with the first lithiated Nafion binder 340. The anode 314 may have a weight ratio of between about 50% to about 67% graphite, and between about 33% to about 50% lithiated Nafion binder.

The lithiated Nafion binder 340 may provide first lithium ion pathways in or through the anode 314 (e.g., between the graphite particles 316, etc.). Lithium ions 330 may therefore pass or flow through the anode 314 during charging and discharging of the lithium-ion cell 300. Because the lithiated Nafion membrane 312 also includes Nafion, lithium ions 330 may pass through the lithium-ion cell 300, and more particularly between the lithiated Nafion membrane 312 and the anode 314, without the use of liquid electrolyte.

As discussed with respect to FIG. 2, the cathode 316 may include lithium cobalt oxide that is dispersed in a second lithiated Nafion binder. In a second detail view 330 of an interface between the cathode 316 and the lithiated Nafion membrane 312, lithium cobalt oxide particles 318 are illustrated as dispersed in a second lithiated Nafion binder 340, which may be the same material as the first lithiated Nafion binder. The lithium cobalt oxide particles 318 may be dispersed and held together or bound with the second lithiated Nafion binder 340. The cathode 316 may have a weight ratio of between about 50% to about 67% lithium cobalt oxide, and between about 33% to about 50% lithiated Nafion binder.

The lithiated Nafion binder 340 may provide second lithium ion pathways in or through the cathode 316 (e.g., between the lithium cobalt oxide particles 318, etc.). Lithium ions 330 may therefore pass or flow through the cathode 316 during charging and discharging of the lithium-ion cell 300.

Because the lithiated Nafion membrane 312 also includes Nafion that conducts lithium ions during charging and discharging, lithium ions 330 may pass through the lithium-ion cell 300, and more particularly between the lithiated Nafion membrane 312 and the cathode 316, without the use of liquid electrolyte. In some instances, the lithium ions 330 may pass through the cathode 316 using the second lithium ion pathways, through the lithiated Nafion binder 312, and through the anode 314 using the first lithium ion pathways to complete the circuit across the lithium-ion cell 300. Accordingly, the lithium-ion cell 300 may not rely on pores and/or wettability to operate, unlike typical lithium-ion cells.

Figure 4:
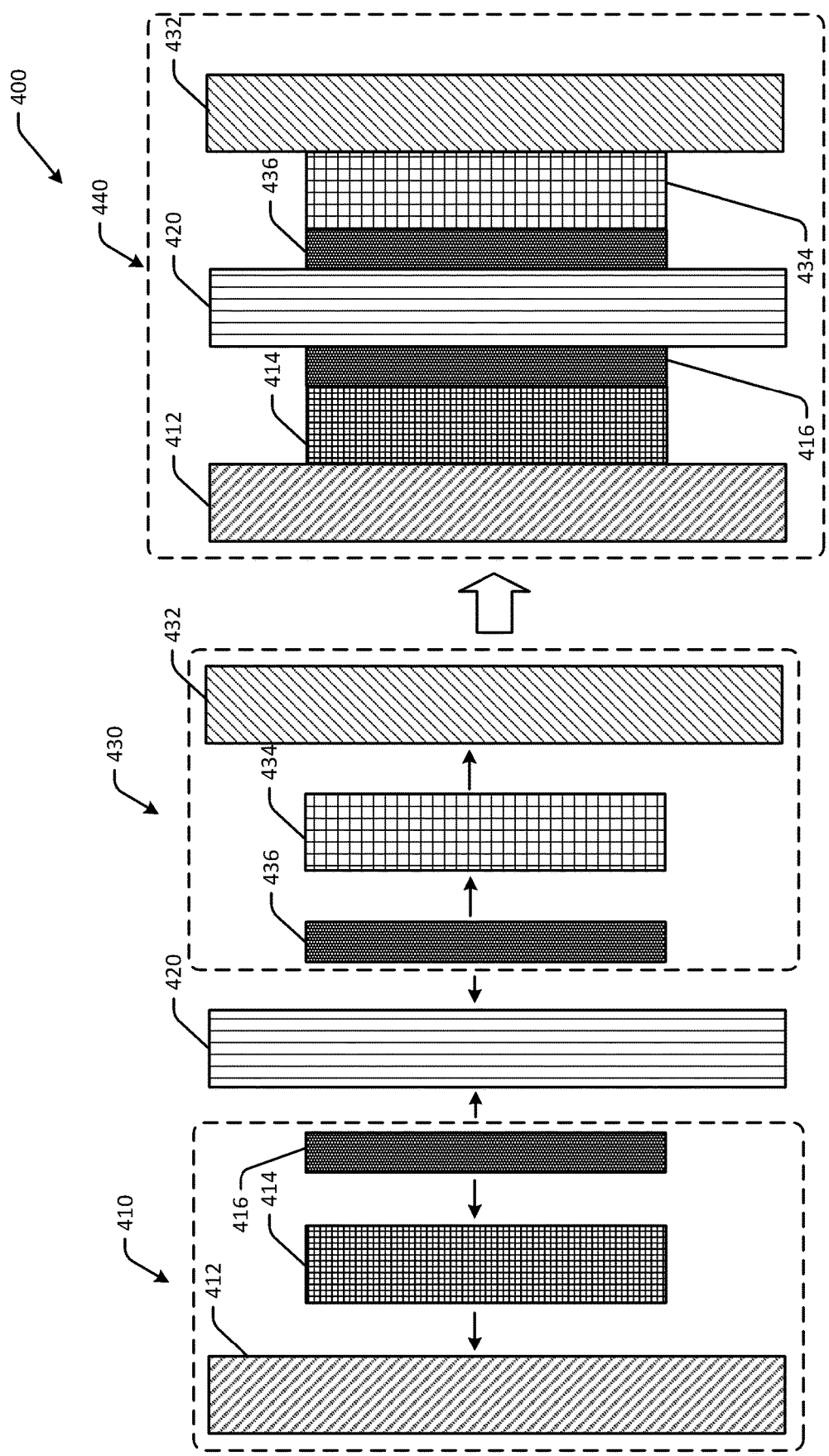
FIG. 4 is a schematic illustration of a cross-sectional view of a lithium-ion cell with a solid electrolyte membrane and layers in accordance with one or more embodiments of the disclosure.

FIG. 4 is a schematic illustration of a cross-sectional view of a lithium-ion cell 400 with a solid electrolyte membrane and layers (also referred to as sublayers herein) in accordance with one or more embodiments of the disclosure. Other embodiments may include additional or fewer components. The lithium-ion cell 400 may be the same lithium-ion cell discussed with respect to FIGS. 2 and 3.

The lithium-ion cell 400 may be part of a lithium-ion battery. For example, a lithium-ion battery may include one or more lithium-ion cells 400. The lithium-ion cell 400 may be disposed in a pouch, such as in an interior portion of a flexible or rigid battery pouch, or other suitable package. In some embodiments, the lithium-ion cell 400 may be part of a lithium-ion pouch battery.

In FIG. 4, the lithium-ion cell 400 may include a first assembly 410, a lithiated Nafion membrane 420, and a second assembly 430. The lithiated Nafion membrane 420 may be a lithiated solid polymer electrolyte Nafion membrane. The first assembly 410 may be coupled to a first side of the lithiated Nafion membrane 420, and the second assembly 430 may be coupled to a second side, or opposite side, of the lithiated Nafion membrane 420. The first assembly 410 may include more than one component and may be formed or assembled prior to coupling with the lithiated Nafion membrane 420. The second assembly 430 may similarly include more than one component and may be formed or assembled prior to coupling with the lithiated Nafion membrane 420. In other instances, one or more, or all, components of the lithium-ion cell 400 may be formed or otherwise assembled at the same time.

The first assembly 410 may include a copper current collector 412, an anode 414, and a first lithiated Nafion sublayer 416. The copper current collector 412 may be a negative current collector and/or may form a negative terminal of the battery. The copper current collector 412 may be disposed adjacent to the anode 414. In some instances, the copper current collector 412 may be in contact with the anode 414. The copper current collector 412 may form a first end of the lithium-ion cell 400. The anode 414 may be disposed adjacent to the copper current collector 412. For example, both the anode 414 and the first lithiated Nafion sublayer 416 may be disposed between the lithiated Nafion membrane 420 and the aluminum current collector 432.

The anode 414 may be formed of graphite and lithiated Nafion. For example, the anode 414 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 414, as illustrated in FIG. 3, during charging and discharging of the lithium-ion cell 400.

The anode 414 may be coupled to the copper current collector 412. In some embodiments, the anode 414 may be laminated to the copper current collector 412, while in other embodiments, the anode 414 may be coupled to the copper current collector 412 using a heat and compress technique, a pressure-distribution sheet technique, or a different technique.

The first lithiated Nafion sublayer 416 may be a layer of lithiated Nafion that is coupled to the anode 414. The first lithiated Nafion sublayer 416 may increase conductivity between the anode 414 and the lithiated Nafion membrane 420. In some embodiments, the first lithiated Nafion sublayer 416 may increase the number of lithium ion pathways in the anode 414. The first lithiated Nafion sublayer 416 may be disposed between, and/or optionally in contact with both, the anode 414 and the lithiated Nafion membrane 420. In some embodiments, the first lithiated Nafion sublayer 416 may be laminated to the anode 414, while in other embodiments, the first lithiated Nafion sublayer 416 may be coupled to the anode 414 using a heat and compress technique, a pressure-distribution sheet technique, or a different technique.

The lithiated Nafion membrane 420 may be configured to conduct lithium ions during charging and discharging of the lithium-ion cell 400. First lithium ion pathways in the anode 414 may extend from the lithiated Nafion membrane 420 and/or the first lithiated Nafion sublayer 416 to the copper current collector 412. Second lithium ion pathways in the cathode 434 may extend from the lithiated Nafion membrane 420 and/or a second lithiated Nafion sublayer 436 to the aluminum current collector 432.

The second assembly 430 may include an aluminum current collector 432 and a cathode 434. The aluminum current collector 432 may be a positive current collector and/or may form a positive terminal of the battery. The aluminum current collector 432 may be disposed adjacent to the cathode 434. In some instances, the aluminum current collector 432 may be in contact with the cathode 434. The aluminum current collector 432 may form a second end of the lithium-ion cell 400. The cathode 434 may be disposed adjacent to the aluminum current collector 432. The cathode 434 may be disposed between the lithiated Nafion membrane 420 and the aluminum current collector 432. For example, both the cathode 434 and the second lithiated Nafion sublayer 436 may be disposed between the lithiated Nafion membrane 420 and the aluminum current collector 432.

The cathode 434 may be formed of lithium cobalt oxide and lithiated Nafion. For example, the cathode 434 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 434, as illustrated in FIG. 3, during charging and discharging of the lithium-ion cell 400. The second lithium ion pathways may extend from the lithiated solid polymer electrolyte Nafion membrane to the aluminum current collector.

The cathode 434 may be coupled to the aluminum current collector 432. In some embodiments, the cathode 434 may be laminated to the aluminum current collector 432, while in other embodiments, the cathode 434 may be coupled to the aluminum current collector 432 using a heat and compress technique, a pressure-distribution sheet technique, or a different technique.

The second lithiated Nafion sublayer 436 may be a layer of lithiated Nafion that is coupled to the cathode 434. The second lithiated Nafion sublayer 436 may increase conductivity between the cathode 434 and the lithiated Nafion membrane 420. In some embodiments, the second lithiated Nafion sublayer 436 may increase the number of lithium ion pathways in the cathode 434. The second lithiated Nafion sublayer 436 may be disposed between, and/or optionally in contact with both, the cathode 434 and the lithiated Nafion membrane 420. In some embodiments, the second lithiated Nafion sublayer 436 may be laminated to the cathode 434, while in other embodiments, the second lithiated Nafion sublayer 436 may be coupled to the cathode 434 using a heat and compress technique, a pressure-distribution sheet technique, or a different technique.

A first thickness of the first lithiated Nafion sublayer 416 and/or the second lithiated Nafion sublayer 436 may be less than a second thickness of the anode 414 and/or the cathode 434. The first lithiated Nafion sublayer 416 and the second lithiated Nafion sublayer 436 may have equal thicknesses. The first lithiated Nafion sublayer 416 and the second lithiated Nafion sublayer 436 may have a first thickness that is less than or equal to a third thickness of the lithiated Nafion membrane 420. The illustrations in FIG. 4 or any other drawings may not be to scale.

The first assembly 410 may be coupled to a first side of the lithiated Nafion membrane 420, and the second assembly 430 may be coupled to a second side of the lithiated Nafion membrane 420 to form a stack 440. For example, as illustrated in FIG. 4, the stack may include the lithiated Nafion membrane 420 disposed between the first lithiated Nafion sublayer 416 and the second lithiated Nafion sublayer 436, as well as between the anode 414 and the cathode 434. The stack 434 may be formed using a pinch roller or other suitable technique. The stack 440 may be placed into a pouch or other package for use in a battery. Additional methods of manufacturing are discussed with respect to FIG. 6.

Figure 5:
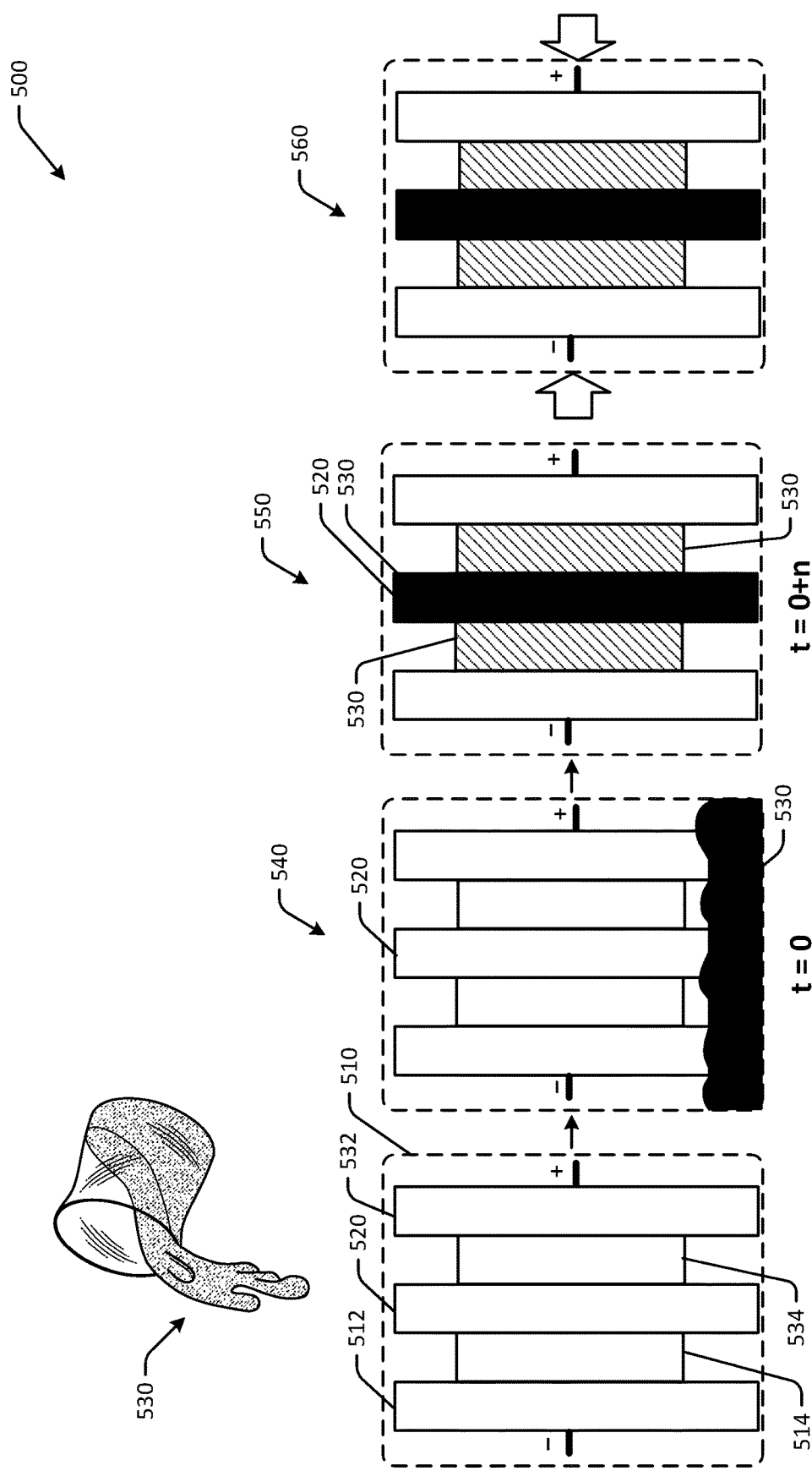
FIG. 5 is a schematic illustration of a cross-sectional view of a lithium-ion cell with a solid electrolyte membrane and electrolyte in accordance with one or more embodiments of the disclosure.

FIG. 5 is a schematic illustration of a cross-sectional view of a lithium-ion cell 500 with a solid electrolyte membrane and electrolyte in accordance with one or more embodiments of the disclosure. Other embodiments may include additional or fewer components. The lithium-ion cell 500 may be the same lithium-ion cell discussed with respect to FIGS. 2-3.

In some embodiments, a liquid electrolyte may be introduced to the lithium-ion cell to improve conductivity. However, rather than free moving liquid electrolyte in a battery package, the liquid electrolyte introduced into the cell may be absorbed by and/or adsorbed to a liquid Nafion membrane. As a result, there may not be any liquid electrolyte that is subject to leaking or degradation (and subsequent gas generation, etc.).

In FIG. 5, the lithium-ion cell 500 may include a copper current collector 512, an anode 514, a lithiated polymer electrolyte membrane 520, a cathode 534, and an aluminum current collector 532. The lithium-ion cell 500 may be placed in a pouch 510 or other package. In some embodiments, lithiated Nafion sublayers, or other components, may be included in the lithium-ion cell 500.

The copper current collector 512 may be a negative current collector and/or may form a negative terminal of the battery. The copper current collector 512 may be disposed adjacent to the anode 514. In some instances, the copper current collector 512 may be in contact with the anode 514. The copper current collector 512 may form a first end of the lithium-ion cell 500. The anode 514 may be disposed adjacent to the copper current collector 512.

The anode 514 may be formed of graphite and lithiated Nafion. For example, the anode 514 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 514, as illustrated in FIG. 3, during charging and discharging of the lithium-ion cell 500.

The lithiated polymer electrolyte membrane 520 may be a lithiated Nafion membrane, and may configured to conduct lithium ions during charging and discharging of the lithium-ion cell 500. First lithium ion pathways in the anode 514 may extend from the lithiated polymer electrolyte membrane 520 to the copper current collector 512. Second lithium ion pathways in the cathode 534 may extend from the lithiated polymer electrolyte membrane 520 to the aluminum current collector 532.

The aluminum current collector 532 may be a positive current collector and/or may form a positive terminal of the battery. The aluminum current collector 532 may be disposed adjacent to the cathode 534. In some instances, the aluminum current collector 532 may be in contact with the cathode 534. The aluminum current collector 532 may form a second end of the lithium-ion cell 500. The cathode 534 may be disposed adjacent to the aluminum current collector 532. The cathode 534 may be disposed between the lithiated polymer electrolyte membrane 520 and the aluminum current collector 532.

The cathode 534 may be formed of lithium cobalt oxide and lithiated Nafion. For example, the cathode 534 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 534, as illustrated in FIG. 3, during charging and discharging of the lithium-ion cell 500. The second lithium ion pathways may extend from the lithiated solid polymer electrolyte Nafion membrane to the aluminum current collector.

A liquid electrolyte 530 may be introduced to the lithium-ion cell 500. For example, the liquid electrolyte 530 may be pipetted, poured, or otherwise provided to the pouch 510. At a first point in time 540 after the liquid electrolyte 530 is introduced to the lithium-ion cell 500, the lithiated polymer electrolyte membrane 520 may absorb and/or adsorb the liquid electrolyte. For example, at t=0 in FIG. 5, the liquid electrolyte 530 may be at a bottom of the pouch 510, and the lithiated polymer electrolyte membrane 520 may begin absorbing and/or adsorbing the liquid electrolyte 530. At a second point in time 550, denoted by t=0+n in FIG. 5, the liquid electrolyte 530 may be absorbed by and/or adsorbed to the lithiated polymer electrolyte membrane 520. In some embodiments, a portion of the liquid electrolyte 530 may be absorbed by and/or adsorbed to the first lithiated Nafion binder of the anode 514 and/or the second lithiated Nafion binder of the cathode 534 (as denoted by the black cross-hatching in FIG. 5), in addition to the lithiated polymer electrolyte membrane 520. Accordingly, the lithiated Nafion binder may also be solvated by the liquid electrolyte.

As a result, the liquid electrolyte 530 may no longer be free to move about the pouch 510 in liquid form. The amount of liquid electrolyte may be significantly less than the amount used in typical lithium-ion cells, such as about 70% less or more. In some embodiments, the lithiated polymer electrolyte membrane 520 may be saturated with the liquid electrolyte 530. Accordingly, an amount of liquid electrolyte 530 introduced to the lithium-ion cell 500 may be determined using saturation properties of the lithiated polymer electrolyte membrane 520. In other embodiments, there may not be any liquid electrolyte 530 introduced into the lithium-ion cell, and as a result, the battery and/or cell may be devoid of a liquid electrolyte.

As illustrated in FIG. 5, at a third point in time 560, the lithium-ion cell 500 may be compressed during bonding. Compression may be in either or both the lateral or vertical directions. Compression may be a result of change in dimension of the lithiated polymer electrolyte membrane 520 (e.g., due to swelling) and/or other components of the lithium-ion cell 500.

Figure 6:
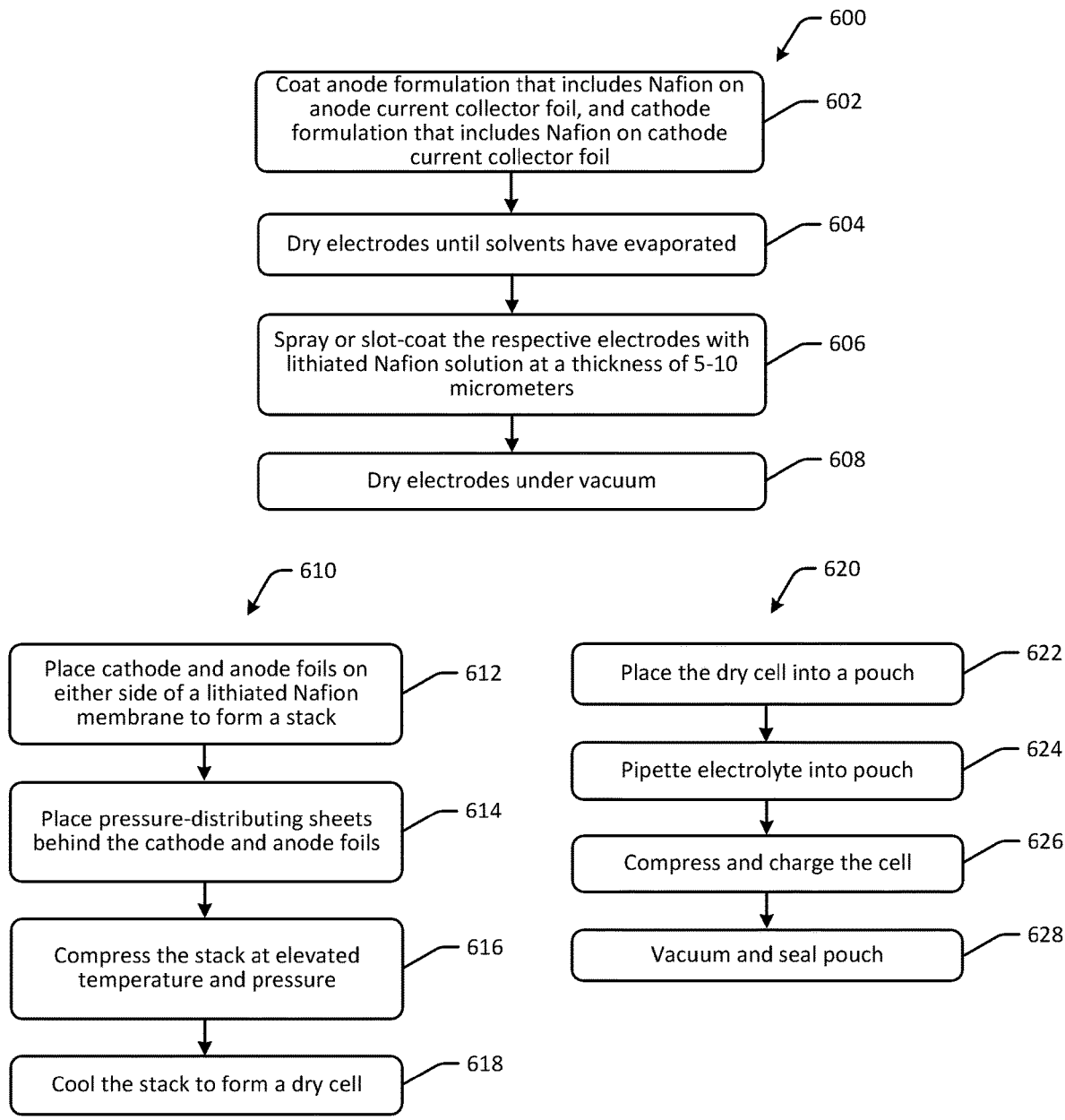
FIG. 6 depicts various methods of manufacturing lithium-ion batteries with solid electrolyte membranes in accordance with one or more embodiments of the disclosure.

FIG. 6 depicts various methods of manufacturing lithium-ion batteries with solid electrolyte membranes and/or subcomponents in accordance with one or more embodiments of the disclosure. Other embodiments may include additional, fewer, or different operations than those illustrated in the examples of FIG. 6. In some embodiments, a sequence of operations may be different than that illustrated in FIG. 6.

A first example process flow 600 for manufacturing a cell for lithium-ion batteries in accordance with one or more embodiments is depicted. The process flow 600 may be used to form a cell with Nafion as a separator and/or electrolyte with Nafion binder in the respective electrodes.

At a first block 602, an anode formulation that includes Nafion may be coated on an anode current collector foil, and a cathode formulation that includes Nafion may be coated on a cathode current collector foil. For example, the anode formulation may be coated on a high-purity copper anode current collector foil. The copper foil may have a matted surface in some embodiments, or a smooth surface in other embodiments. Similarly, the cathode formulation may be coated on a high-purity aluminum cathode current collector foil, where the aluminum foil may have a matted surface in some embodiments, or a smooth surface in other embodiments.

The anode formulation may include lithiated Nafion in either a dispersion form or a powder form. The anode formulation composition with either the dispersion form or the powder form of lithiated Nafion may be substantially equal, as determined by the percentage of Nafion in the electrode.

To create the anode formulation using a liquid Nafion binder, the constituents illustrated in Table 1 may be mixed in a plastic or ceramic bowl with a lid. After mixing, zirconia ceramic beads or any other suitable high energy mixing equipment may be added to thoroughly mix the anode formulation. The viscosity of the final anode formulation is decided based on the electrode coating method. If electrodes are coated by slot-coating, then the viscosity may be in the range of 1000-5000 centipoise. Table 1 illustrates the range of composition of Nafion in the anode electrode from 33% to 50%. The resulting anode formulation may be coated on a high-purity copper anode current collector foil at the first block 602.

TABLE 1

| Constituents | Quantity (g) | % in wet mixture/ % in dry electrode | % in wet mixture/ % in dry electrode |
|---|---|---|---|
| Graphite | 1 | 14.3/67 | 8.3/50 |
| 1100 EW Lithium-Ion (10 wt % Nafion in n-Propanol) | 0.5 | 71.4/33 | 83.3/50 |
| De-Ionized Water | 1 | 14.3/0 | 8.3/0 |

To create the anode formulation using a powder Nafion binder, the powder Nafion binder may be mixed with graphite powder and the isopropanol solvent to create an ink/paste that can be coated by slot-coating or doctor-blading. The solvent content can be adjusted to create a formulation of the appropriate viscosity. Similar to the liquid Nafion binder, appropriate mixing equipment may be employed to produce a desired viscosity. Table 2 provides example Nafion composition ranges for lithium-ion batteries as described herein. The resulting anode formulation may be coated on a high-purity copper anode current collector foil at the first block 602.

TABLE 2

| Constituents | Quantity (g) | % in wet mixture/ % in dry electrode | % in wet mixture/ % in dry electrode |
|---|---|---|---|
| Graphite | 1 | 33/50 | 40/67 |
| 1100 EW Lithium-Ion powder (10 wt % Nafion in n-Propanol) | 1 | 33/50 | n/a |
| 1100 EW Lithium-Ion powder (10 wt % Nafion in n-Propanol) | 0.5 | 20/33 | n/a |
| Iso-propanol | 1 | 33/0 | 40/0 |

To create the cathode formulation using a liquid Nafion binder, the constituents illustrated in Table 3 may be mixed in a plastic or ceramic bowl with a lid. After mixing, zirconia ceramic beads or any other suitable high energy mixing equipment may be added to thoroughly mix the anode formulation. The viscosity of the final anode formulation is decided based on the electrode coating method. If electrodes are coated by slot-coating, then the viscosity may be in the range of 1000-5000 centipoise. Table 1 illustrates the range of composition of Nafion in the anode electrode from 33% to 50%. The resulting cathode formulation may be coated on a high-purity aluminum cathode current collector foil at the first block 602.

TABLE 3

| Constituents | Quantity (g) | % in wet mixture/ % in dry electrode | % in wet mixture/ % in dry electrode |
|---|---|---|---|
| $LiCoO_2$ | 1 | 14.3/67 | 8.3/50 |
| 1100 EW Lithium-Ion (10 wt % Nafion in n-Propanol) | 0.5 | 71.4/33 | 83.3/50 |
| De-Ionized Water | 1 | 14.3/0 | 8.3/0 |

To create the cathode formulation using a powder Nafion binder, the powder Nafion binder may be mixed with the cathode active material (e.g., $LiCoO_2$ powder, etc.) and the isopropanol solvent to create an ink/paste that can be coated by slot-coating or doctor-blading. The solvent content can be adjusted to create a formulation of the appropriate viscosity. Similar to the liquid Nafion binder, appropriate mixing equipment may be employed to produce a desired viscosity. Table 4 provides example Nafion composition ranges for lithium-ion batteries as described herein. The resulting cathode formulation may be coated on a high-purity aluminum cathode current collector foil at the first block 602.

TABLE 4

| Constituents | Quantity (g) | % in wet mixture/ % in dry electrode | % in wet mixture/ % in dry electrode |
|---|---|---|---|
| $LiCoO_2$ | 1 | 33/50 | 40/67 |
| 1100 EW Lithium-Ion powder (10 wt % Nafion in n-Propanol) | 1 | 33/50 | n/a |
| 1100 EW Lithium-Ion powder (10 wt % Nafion in n-Propanol) | 0.5 | 20/33 | n/a |
| Iso-propanol | 1 | 33/0 | 40/0 |

At a second block 604, the anode and cathode electrodes may be dried until the solvents have evaporated. For example, the anode and cathode may each be dried for about 30 minutes at a temperature of about 120 degrees Celsius and/or until all solvents have evaporated. In some embodiments, Nafion sublayers may also be coated and dried on the respective cathode and anode electrodes.

At a third block 606, the electrodes may be sprayed or slot-coated with a lithiated Nafion solution at a thickness of between about 5 to about 10 microns. For example, the anode and the cathode may each be sprayed or otherwise coated with a lithiated Nafion solution to create a contiguous layer of recast Nafion that is approximately 5 to 10 microns thick.

At a fourth block 608, the electrodes may be dried under a vacuum. For example, the anode and cathode may be dried at a temperature of about 120 degrees Celsius for about 30 minutes under vacuum of $10^{-3}$ Torr. The electrodes may be dried until all solvents have evaporated.

A second example process flow 610 for manufacturing a dry cell for lithium-ion batteries (e.g., a membrane electrode assembly, etc.) in accordance with one or more embodiments is depicted. The process flow 600 may be used to form a dry cell with Nafion as a separator and/or electrolyte with Nafion binder in the respective electrodes.

At a first block 612, the cathode foil and the anode foil may be placed on either side of a lithiated Nafion membrane to form a stack. For example, the cathode foil and the anode foil formed as output of the first process flow 600 may be placed on opposite sides of a lithiated Nafion membrane to form a stack. The lithiated Nafion membrane may be a lithiated solid polymer electrolyte Nafion membrane configured to conduct lithium ions.

At a second block 614, pressure-distributing sheets may be placed behind the cathode and anode foils. For example, a pressure-distributing sheet, such as a GYLON® material, may be placed on the outside surfaces of, or otherwise adjacent to, the cathode and anode foils.

At a third block 616, the stack may be compressed at an elevated temperature and pressure. For example, the stack, including the pressure-distributing sheets, may be compressed at a pressure of about 200 pounds per square inch and at a temperature of about 120 degrees Celsius. The stack may remain compressed for about 5-6 minutes. The temperature may be maintained to within about 1 degree during compression.

At a fourth block 618, the stack may be cooled to form a dry cell. For example, after compression is complete, the stack may be allowed to cool, or actively cooled, to room temperature.

A third example process flow 620 for manufacturing a wet cell for lithium-ion batteries in accordance with one or more embodiments is depicted. The process flow 600 may be used to form a wet cell with Nafion as a separator and/or electrolyte with Nafion binder in the respective electrodes.

At a first block 622, the dry cell formed as output of the second process flow 610 may be placed into a pouch. For example, the dry cell may be placed into a flexible pouch, such as an aluminum pouch, after the dry cell cools to room temperature. The pouch may be sealed with a spout, notch, or other opening remaining through which liquid electrolyte can be placed into the pouch.

At a second block 624, the electrolyte may be pipetted into the pouch. For example, a volume of liquid electrolyte (e.g., EC+DMC+1M LiPF6, etc.) may be pipetted or otherwise placed into the pouch through the opening. After the electrolyte is placed into the pouch, the pouch may sit for a period of time, such as about 30 minutes.

At a third block 626, the cell may be compressed and charged. For example, the pouch and/or cell may be compressed at a pressure of about 2 to about 5 pounds per square inch. The pouch may be compressed for about 30 minutes to provide time for the lithiated Nafion membrane to fully absorb or adsorb the electrolyte. In some instances, using a warm electrolyte, or heating the cell to about 35 to about 40 degrees Celsius during compression, may improve absorption or adsorption of the electrolyte by the lithiated Nafion membrane.

While the pouch and/or cell is compressed, and after the liquid electrolyte is placed into the pouch, the cell may be charged at a rate of about 0.5 coulomb at room temperature until the cell voltage is about 4.3 volts to about 4.5 volts. After the cell voltage is about 4.3 volts to about 4.5 volts, the cell may be compressed to about 20 pounds per square inch while the pouch remains at least partially unsealed.

At a fourth block 628, the pouch may be vacuumed and sealed. For example, the pouch may be vacuumed to remove gases and/or any excess liquid electrolyte, and may then be sealed to enclose the cell in the pouch. In some embodiments, the pouch may be vacuumed and sealed while compressed at about 20 pounds per square inch.

For cell formation, the battery may be charged to about 4.5 volts and discharged to about 2.5 volts while compressed, and the compressed cell may be cycled two to five times from about 4.5 volts to about 2.5 volts. Cell formation should occur within about five to about ten charge and discharge cycles. The coulombic efficiency may be monitored to determine the endpoint of the formation step. The coulombic efficiency may be between about 95% and about 98% within ten charge cycles.

Figure 7:
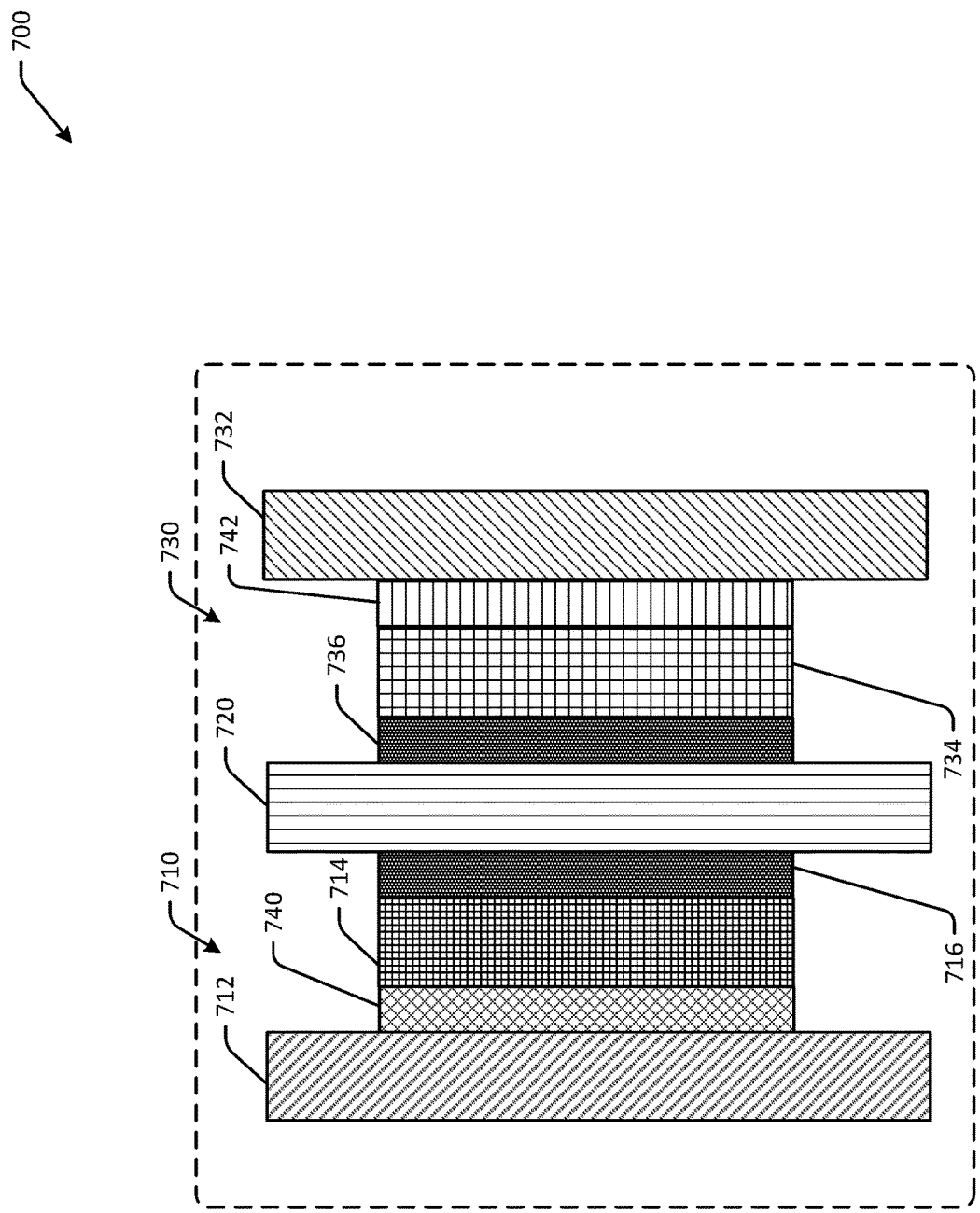
FIG. 7 is a schematic illustration of a cross-sectional view of a lithium-ion cell with a solid electrolyte membrane and layers in accordance with one or more embodiments of the disclosure.

FIG. 7 is a schematic illustration of a cross-sectional view of a lithium-ion cell 700 with a solid electrolyte membrane and layers (also referred to as sublayers herein) in accordance with one or more embodiments of the disclosure. Other embodiments may include additional or fewer components.

The lithium-ion cell 700 may have a solid polymer electrolyte, and may increase battery robustness. The lithium-ion cell 700 may include a set of layers between the electrodes and the current collectors. The sublayers may be formed of PVDF and the respective electrode materials. For example, for the anode, the adjacent sublayer may be formed of graphite and PVDF, and for the cathode, the adjacent sublayer may be formed of lithium cobalt oxide and PVDF. The sublayers may ensure that Nafion in the electrode layers does not interact with the current collector materials. Because Nafion is a superacid, Nafion may corrode the copper and aluminum current collectors. The resulting ionic contaminants can ion-exchange with the Nafion and cause reduction in conductivity, as well as a reduction in capacity. The addition of sublayers may therefore reduce or eliminate all contact. As a result, only electron flow occurs between the sublayers and the current collectors, and all ionic interactions occur in the Nafion sublayer and the electrodes.

The lithium-ion cell 700 may be part of a lithium-ion battery. For example, a lithium-ion battery may include one or more lithium-ion cells 700. The lithium-ion cell 700 may be disposed in a pouch, such as in an interior portion of a flexible or rigid battery pouch, or other suitable package. In some embodiments, the lithium-ion cell 700 may be part of a lithium-ion pouch battery.

In FIG. 7, the lithium-ion cell 700 may include a first assembly 710, a lithiated Nafion membrane 720, and a second assembly 730. The lithiated Nafion membrane 720 may be a lithiated solid polymer electrolyte Nafion membrane. The first assembly 710 may be coupled to a first side of the lithiated Nafion membrane 720, and the second assembly 730 may be coupled to a second side, or opposite side, of the lithiated Nafion membrane 720. The first assembly 710 may include more than one component and may be formed or assembled prior to coupling with the lithiated Nafion membrane 720. The second assembly 730 may similarly include more than one component and may be formed or assembled prior to coupling with the lithiated Nafion membrane 720. In other instances, one or more, or all, components of the lithium-ion cell 700 may be formed or otherwise assembled at the same time.

The first assembly 710 may include a copper current collector 712, a first sublayer 740, an anode 714, and a first lithiated Nafion sublayer 716. The copper current collector 712 may be a negative current collector and/or may form a negative terminal of the battery. The copper current collector 712 may be disposed adjacent to the first sublayer 740. The first sublayer 740 may be positioned between the copper current collector 712 and the anode 714. The copper current collector 712 may be in contact with first sublayer 740. The copper current collector 712 may form a first end of the lithium-ion cell 700. The anode 714 may be disposed adjacent to the first sublayer 740. The anode 714, the first sublayer 740, and the first lithiated Nafion sublayer 716 may be disposed between the lithiated Nafion membrane 720 and the copper current collector 712.

The first sublayer 740 may be in contact with the copper current collector 712 and the anode 714. The first sublayer 740 may be formed of PVDF. In some embodiments, the first sublayer 740 may be formed of graphite and PVDF. For example, the first sublayer 740 may not include Nafion and may therefore form an insulating layer between the copper current collector 712 and the anode 714. In some embodiments, the first sublayer 740 may be laminated to the anode 714, while in other embodiments, the first sublayer 740 may be coupled to the anode 714 using a heat and compress technique, a pressure-distribution sheet technique, or a different technique.

The anode 714 may be formed of graphite and lithiated Nafion. For example, the anode 714 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 714, as illustrated in FIG. 3, during charging and discharging of the lithium-ion cell 700.

The first lithiated Nafion sublayer 716 may be a layer of lithiated Nafion that is coupled to the anode 714. The first lithiated Nafion sublayer 716 may increase conductivity between the anode 714 and the lithiated Nafion membrane 720. In some embodiments, the first lithiated Nafion sublayer 716 may increase the number of lithium ion pathways in the anode 714. The first lithiated Nafion sublayer 716 may be disposed between, and/or optionally in contact with both, the anode 714 and the lithiated Nafion membrane 720. In some embodiments, the first lithiated Nafion sublayer 716 may be laminated to the anode 714, while in other embodiments, the first lithiated Nafion sublayer 716 may be coupled to the anode 714 using a heat and compress technique, a pressure-distribution sheet technique, or a different technique.

The lithiated Nafion membrane 720 may be configured to conduct lithium ions during charging and discharging of the lithium-ion cell 700. First lithium ion pathways in the anode 714 may extend from the lithiated Nafion membrane 720 and/or the first lithiated Nafion sublayer 716 to the copper current collector 712. Second lithium ion pathways in the cathode 734 may extend from the lithiated Nafion membrane 720 and/or a second lithiated Nafion sublayer 736 to the aluminum current collector 732.

The second assembly 730 may include an aluminum current collector 732, a second sublayer 742, a cathode 734, and a second lithiated Nafion sublayer 736. The aluminum current collector 732 may be a positive current collector and/or may form a positive terminal of the battery. The aluminum current collector 732 may be disposed adjacent to the second sublayer 742. In some instances, the aluminum current collector 732 may be in contact with the second sublayer 742. The aluminum current collector 732 may form a second end of the lithium-ion cell 700. The cathode 734 may be disposed adjacent to the second sublayer 742, such that the second sublayer 742 is between the cathode 734 and the aluminum current collector 732. The cathode 734 may be disposed between the lithiated Nafion membrane 720 and the aluminum current collector 732. For example, the cathode 734, the second sublayer 742, and the second lithiated Nafion sublayer 736 may be disposed between the lithiated Nafion membrane 720 and the aluminum current collector 732.

The cathode 734 may be formed of lithium cobalt oxide and lithiated Nafion. For example, the cathode 734 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 734, as illustrated in FIG. 3, during charging and discharging of the lithium-ion cell 700. The second lithium ion pathways may extend from the lithiated solid polymer electrolyte Nafion membrane to the aluminum current collector.

The second sublayer 742 may be in contact with the aluminum current collector 732 and the cathode 734. The second sublayer 742 may be formed of PVDF. In some embodiments, the second sublayer 732 may be formed of lithium cobalt oxide and PVDF. For example, the second sublayer 742 may not include Nafion and may therefore form an insulating layer between the aluminum current collector 732 and the cathode 734. In some embodiments, the second sublayer 742 may be laminated to the cathode 734, while in other embodiments, the second sublayer 742 may be coupled to the cathode 734 using a heat and compress technique, a pressure-distribution sheet technique, or a different technique.

The cathode 734 may be coupled to the second sublayer 742. In some embodiments, the cathode 734 may be laminated to the second sublayer 742, while in other embodiments, the cathode 734 may be coupled to the second sublayer 742 using a heat and compress technique, a pressure-distribution sheet technique, or a different technique.

The second lithiated Nafion sublayer 736 may be a layer of lithiated Nafion that is coupled to the cathode 734. The second lithiated Nafion sublayer 736 may increase conductivity between the cathode 734 and the lithiated Nafion membrane 720. In some embodiments, the second lithiated Nafion sublayer 736 may increase the number of lithium ion pathways in the cathode 734. The second lithiated Nafion sublayer 736 may be disposed between, and/or optionally in contact with both, the cathode 734 and the lithiated Nafion membrane 720. In some embodiments, the second lithiated Nafion sublayer 736 may be laminated to the cathode 734, while in other embodiments, the second lithiated Nafion sublayer 736 may be coupled to the cathode 734 using a heat and compress technique, a pressure-distribution sheet technique, or a different technique.

A first thickness of the first lithiated Nafion sublayer 716 and/or the second lithiated Nafion sublayer 736 may be less than a second thickness of the anode 714 and/or the cathode 734. The first lithiated Nafion sublayer 716 and the second lithiated Nafion sublayer 736 may have equal thicknesses. The first lithiated Nafion sublayer 716 and the second lithiated Nafion sublayer 736 may have a first thickness that is less than or equal to a third thickness of the lithiated Nafion membrane 720. The illustrations in FIG. 7 or any other drawings may not be to scale.

The first assembly 710 may be coupled to a first side of the lithiated Nafion membrane 720, and the second assembly 730 may be coupled to a second side of the lithiated Nafion membrane 720 to form a stack 740. For example, as illustrated in FIG. 7, the stack may include the lithiated Nafion membrane 720 disposed between the first lithiated Nafion sublayer 716 and the second lithiated Nafion sublayer 736, as well as between the anode 714 and the cathode 734. The stack may be formed using a pinch roller or other suitable technique. The stack may be placed into a pouch or other package for use in a battery.

Figure 8:
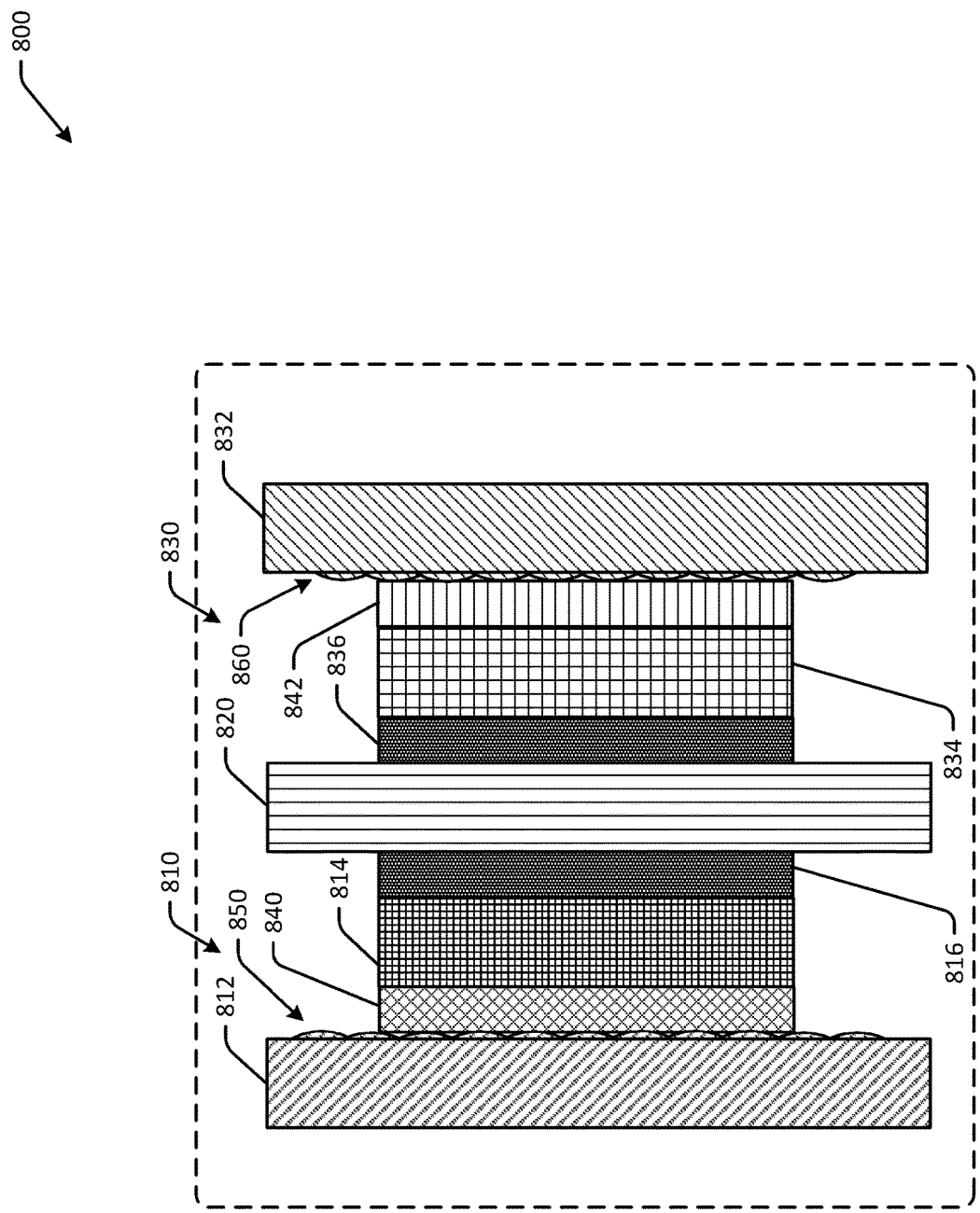
FIG. 8 is a schematic illustration of a cross-sectional view of a lithium-ion cell with a solid electrolyte membrane and current collectors having roughened surfaces in accordance with one or more embodiments of the disclosure.

FIG. 8 is a schematic illustration of a cross-sectional view of a lithium-ion cell 800 with a solid electrolyte membrane and current collectors having roughened surfaces in accordance with one or more embodiments of the disclosure. Other embodiments may include additional or fewer components.

The lithium-ion cell 800 may include current collectors with roughened surfaces, or current collectors that have surface features resulting in increased surface areas at interfaces with respective sublayers of the lithium-ion cell 800. Roughening may cause the electrodes to stay attached to the current collectors throughout the battery electrode and cell manufacturing process. Roughening may also reduce the electrical resistivity between the electrodes and the current collectors.

The lithium-ion cell 800 may be part of a lithium-ion battery. For example, a lithium-ion battery may include one or more lithium-ion cells 800. The lithium-ion cell 800 may be disposed in a pouch, such as in an interior portion of a flexible or rigid battery pouch, or other suitable package. In some embodiments, the lithium-ion cell 800 may be part of a lithium-ion pouch battery.

In FIG. 8, the lithium-ion cell 800 may include a first assembly 810, a lithiated Nafion membrane 820, and a second assembly 830. The lithiated Nafion membrane 820 may be a lithiated solid polymer electrolyte Nafion membrane. The first assembly 810 may be coupled to a first side of the lithiated Nafion membrane 820, and the second assembly 830 may be coupled to a second side, or opposite side, of the lithiated Nafion membrane 820. The first assembly 810 may include more than one component and may be formed or assembled prior to coupling with the lithiated Nafion membrane 820. The second assembly 830 may similarly include more than one component and may be formed or assembled prior to coupling with the lithiated Nafion membrane 820. In other instances, one or more, or all, components of the lithium-ion cell 800 may be formed or otherwise assembled at the same time.

The first assembly 810 may include a copper current collector 812, a first sublayer 840, an anode 814, and a first lithiated Nafion sublayer 816. The copper current collector 812 may be a negative current collector and/or may form a negative terminal of the battery. The copper current collector 812 may be disposed adjacent to the first sublayer 840. The first sublayer 840 may be positioned between the copper current collector 812 and the anode 814. The copper current collector 812 may be in contact with first sublayer 840. The copper current collector 812 may form a first end of the lithium-ion cell 800. The copper current collector 812 may include one or more surface features 850 that cause a first surface of the copper current collector 812 that is in contact with the first sublayer 840 to be a roughened surface. The roughened surface may have an increased surface area relative to other surfaces. Roughened surfaces may be matted and/or corrugated surfaces.

The anode 814 may be disposed adjacent to the first sublayer 840. The anode 814, the first sublayer 840, and the first lithiated Nafion sublayer 816 may be disposed between the lithiated Nafion membrane 820 and the copper current collector 812.

The first sublayer 840 may be in contact with the copper current collector 812 and the anode 814. The first sublayer 840 may be formed of PVDF. In some embodiments, the first sublayer 840 may be formed of graphite and PVDF. For example, the first sublayer 840 may not include Nafion and may therefore form an insulating layer between the copper current collector 812 and the anode 814. In some embodiments, the first sublayer 840 may be laminated to the anode 814, while in other embodiments, the first sublayer 840 may be coupled to the anode 814 using a heat and compress technique, a pressure-distribution sheet technique, or a different technique.

The anode 814 may be formed of graphite and lithiated Nafion. For example, the anode 814 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 814, as illustrated in FIG. 3, during charging and discharging of the lithium-ion cell 800.

The first lithiated Nafion sublayer 816 may be a layer of lithiated Nafion that is coupled to the anode 814. The first lithiated Nafion sublayer 816 may increase conductivity between the anode 814 and the lithiated Nafion membrane 820. In some embodiments, the first lithiated Nafion sublayer 816 may increase the number of lithium ion pathways in the anode 814. The first lithiated Nafion sublayer 816 may be disposed between, and/or optionally in contact with both, the anode 814 and the lithiated Nafion membrane 820. In some embodiments, the first lithiated Nafion sublayer 816 may be laminated to the anode 814, while in other embodiments, the first lithiated Nafion sublayer 816 may be coupled to the anode 814 using a heat and compress technique, a pressure-distribution sheet technique, or a different technique.

The lithiated Nafion membrane 820 may be configured to conduct lithium ions during charging and discharging of the lithium-ion cell 800. First lithium ion pathways in the anode 814 may extend from the lithiated Nafion membrane 820 and/or the first lithiated Nafion sublayer 816 to the copper current collector 812. Second lithium ion pathways in the cathode 834 may extend from the lithiated Nafion membrane 820 and/or a second lithiated Nafion sublayer 836 to the aluminum current collector 832.

The second assembly 830 may include an aluminum current collector 832, a second sublayer 842, a cathode 834, and a second lithiated Nafion sublayer 836. The aluminum current collector 832 may be a positive current collector and/or may form a positive terminal of the battery. The aluminum current collector 832 may be disposed adjacent to the second sublayer 842. In some instances, the aluminum current collector 832 may be in contact with the second sublayer 842. The aluminum current collector 832 may form a second end of the lithium-ion cell 800. The aluminum current collector 832 may include one or more surface features 860 that cause a first surface of the aluminum current collector 832 that is in contact with the second sublayer 842 to be a roughened surface. The roughened surface may have an increased surface area relative to other surfaces. Roughened surfaces may be matted and/or corrugated surfaces.

The cathode 834 may be disposed adjacent to the second sublayer 842, such that the second sublayer 842 is between the cathode 834 and the aluminum current collector 832. The cathode 834 may be disposed between the lithiated Nafion membrane 820 and the aluminum current collector 832. For example, the cathode 834, the second sublayer 842, and the second lithiated Nafion sublayer 836 may be disposed between the lithiated Nafion membrane 820 and the aluminum current collector 832.

The cathode 834 may be formed of lithium cobalt oxide and lithiated Nafion. For example, the cathode 834 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 834, as illustrated in FIG. 3, during charging and discharging of the lithium-ion cell 800. The second lithium ion pathways may extend from the lithiated solid polymer electrolyte Nafion membrane to the aluminum current collector.

The second sublayer 842 may be in contact with the aluminum current collector 832 and the cathode 834. The second sublayer 842 may be formed of PVDF. In some embodiments, the second sublayer 832 may be formed of lithium cobalt oxide and PVDF. For example, the second sublayer 842 may not include Nafion and may therefore form an insulating layer between the aluminum current collector 832 and the cathode 834. In some embodiments, the second sublayer 842 may be laminated to the cathode 834, while in other embodiments, the second sublayer 842 may be coupled to the cathode 834 using a heat and compress technique, a pressure-distribution sheet technique, or a different technique.

The cathode 834 may be coupled to the second sublayer 842. In some embodiments, the cathode 834 may be laminated to the second sublayer 842, while in other embodiments, the cathode 834 may be coupled to the second sublayer 842 using a heat and compress technique, a pressure-distribution sheet technique, or a different technique.

The second lithiated Nafion sublayer 836 may be a layer of lithiated Nafion that is coupled to the cathode 834. The second lithiated Nafion sublayer 836 may increase conductivity between the cathode 834 and the lithiated Nafion membrane 820. In some embodiments, the second lithiated Nafion sublayer 836 may increase the number of lithium ion pathways in the cathode 834. The second lithiated Nafion sublayer 836 may be disposed between, and/or optionally in contact with both, the cathode 834 and the lithiated Nafion membrane 820. In some embodiments, the second lithiated Nafion sublayer 836 may be laminated to the cathode 834, while in other embodiments, the second lithiated Nafion sublayer 836 may be coupled to the cathode 834 using a heat and compress technique, a pressure-distribution sheet technique, or a different technique.

A first thickness of the first lithiated Nafion sublayer 816 and/or the second lithiated Nafion sublayer 836 may be less than a second thickness of the anode 814 and/or the cathode 834. The first lithiated Nafion sublayer 816 and the second lithiated Nafion sublayer 836 may have equal thicknesses. The first lithiated Nafion sublayer 816 and the second lithiated Nafion sublayer 836 may have a first thickness that is less than or equal to a third thickness of the lithiated Nafion membrane 820. The illustrations in FIG. 8 or any other drawings may not be to scale.

The first assembly 810 may be coupled to a first side of the lithiated Nafion membrane 820, and the second assembly 830 may be coupled to a second side of the lithiated Nafion membrane 820 to form a stack 840. For example, as illustrated in FIG. 8, the stack may include the lithiated Nafion membrane 820 disposed between the first lithiated Nafion sublayer 816 and the second lithiated Nafion sublayer 836, as well as between the anode 814 and the cathode 834. The stack may be formed using a pinch roller or other suitable technique. The stack may be placed into a pouch or other package for use in a battery.

Figure 9:
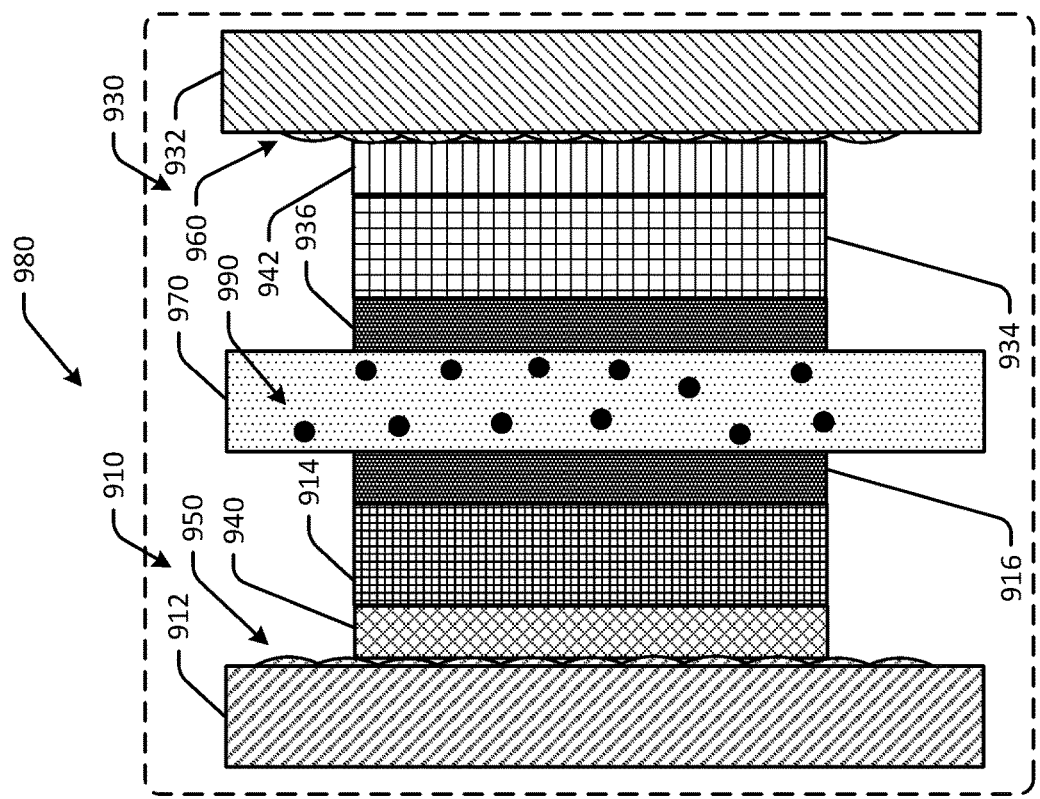
FIG. 9 is a schematic illustration of a cross-sectional view of a lithium-ion cell with a composite solid electrolyte membrane in accordance with one or more embodiments of the disclosure.
Figure 9:
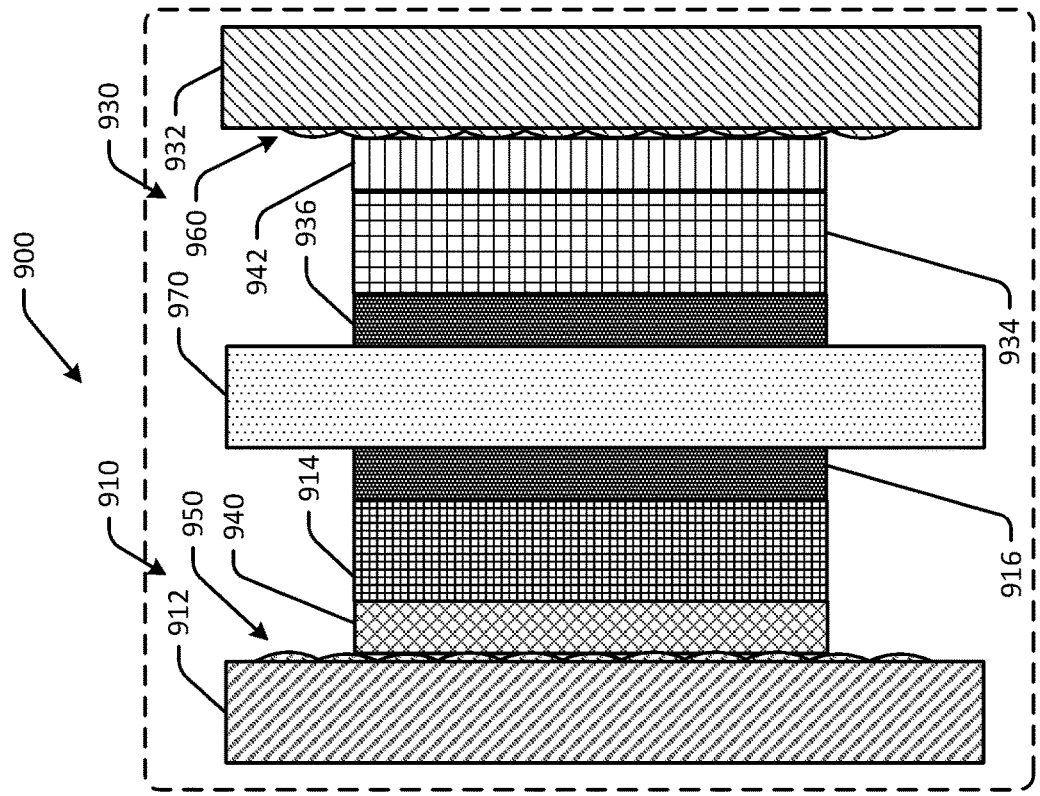

FIG. 9 is a schematic illustration of a cross-sectional view of a first lithium-ion cell 900 and a second lithium-ion cell 980, each having a composite solid electrolyte membrane in accordance with one or more embodiments of the disclosure. Other embodiments may include additional or fewer components.

Both the first lithium-ion cell 900 and the second lithium-ion cell 980 may have a solid polymer electrode separator that is composite. For example, the composite solid polymer electrode separator may be formed of cheaper porous materials, such as plastic (e.g., polyethylene, PTFE, etc.), and pores in the plastic may be filled with Nafion electrolyte material. The porosity of the base membrane, which may be plastic, may be between about 50% to about 70%, and a thickness of the base membrane may be between about 6 micrometers to about 12 micrometers. Composite membranes may reduce cost, improve the mechanical strength of the separator assembly, and improve the puncture resistance of the separator. The second lithium-ion cell 980 includes a composite solid polymer electrode separator with inclusions that enhance membrane conductivity and to increase resistance to dendritic puncture. The first lithium-ion cell 900 and the second lithium-ion cell 980 will be described in conjunction with each other.

The first lithium-ion cell 900 and/or the second lithium-ion cell 980 may be part of a lithium-ion battery. For example, a lithium-ion battery may include one or more lithium-ion cells 900, 980. The first lithium-ion cell 900 and/or the second lithium-ion cell 980 may be disposed in a pouch, such as in an interior portion of a flexible or rigid battery pouch, or other suitable package. In some embodiments, the first lithium-ion cell 900 and/or the second lithium-ion cell 980 may be part of a lithium-ion pouch battery.

In FIG. 9, the first lithium-ion cell 900 and/or the second lithium-ion cell 980 may include a first assembly 910, a composite lithiated Nafion membrane 970, and a second assembly 930. In both the first lithium-ion cell 900 and/or the second lithium-ion cell 980, the composite lithiated Nafion membrane 970 may be a composite lithiated solid polymer electrolyte Nafion membrane. The composite lithiated Nafion membrane 970 may be formed of a base membrane having a porosity of between about 50% and about 70%. The base membrane may be a plastic base membrane. The composite lithiated polymer electrolyte membrane 970 may include between about 30% and about 50% lithiated Nafion, and/or between about 50% to about 70% plastic. The first lithium-ion cell 900 may have the composite lithiated polymer electrolyte membrane 970. The second lithium-ion cell 980 may have a composite lithiated polymer electrolyte membrane 970 that also includes one or more lithium-based or Zeolite-based inclusions 990. The inclusions 990 may be formed with any suitable high surface area material, such as Zeolite, and/or suitable lithium containing materials.

The first assembly 910 may be coupled to a first side of the composite lithiated Nafion membrane 970, and the second assembly 930 may be coupled to a second side, or opposite side, of the composite lithiated Nafion membrane 970. The first assembly 910 may include more than one component and may be formed or assembled prior to coupling with the composite lithiated Nafion membrane 970. The second assembly 930 may similarly include more than one component and may be formed or assembled prior to coupling with the composite lithiated Nafion membrane 970. In other instances, one or more, or all, components of the lithium-ion cell 900 may be formed or otherwise assembled at the same time.

The first assembly 910 may include a copper current collector 912, an optional first sublayer 940, an anode 914, and an optional first lithiated Nafion sublayer 916. The copper current collector 912 may be a negative current collector and/or may form a negative terminal of the battery. The copper current collector 912 may be disposed adjacent to the first sublayer 940. The first sublayer 940 may be positioned between the copper current collector 912 and the anode 914. The copper current collector 912 may be in contact with first sublayer 940. The copper current collector 912 may form a first end of the lithium-ion cell 900. The copper current collector 912 may optionally include one or more surface features 950 that cause a first surface of the copper current collector 912 that is in contact with the first sublayer 940 to be a roughened surface. The roughened surface may have an increased surface area relative to other surfaces. Roughened surfaces may be matted and/or corrugated surfaces.

The anode 914 may be disposed adjacent to the first sublayer 940. The anode 914, the first sublayer 940, and the first lithiated Nafion sublayer 916 may be disposed between the composite lithiated Nafion membrane 970 and the copper current collector 912.

The first sublayer 940 may be in contact with the copper current collector 912 and the anode 914. The first sublayer 940 may be formed of PVDF. In some embodiments, the first sublayer 940 may be formed of graphite and PVDF. For example, the first sublayer 940 may not include Nafion and may therefore form an insulating layer between the copper current collector 912 and the anode 914. In some embodiments, the first sublayer 940 may be laminated to the anode 914, while in other embodiments, the first sublayer 940 may be coupled to the anode 914 using a heat and compress technique, a pressure-distribution sheet technique, or a different technique.

The anode 914 may be formed of graphite and lithiated Nafion. For example, the anode 914 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 914, as illustrated in FIG. 3, during charging and discharging of the lithium-ion cell 900.

The first lithiated Nafion sublayer 916 may be a layer of lithiated Nafion that is coupled to the anode 914. The first lithiated Nafion sublayer 916 may increase conductivity between the anode 914 and the composite lithiated Nafion membrane 970. In some embodiments, the first lithiated Nafion sublayer 916 may increase the number of lithium ion pathways in the anode 914. The first lithiated Nafion sublayer 916 may be disposed between, and/or optionally in contact with both, the anode 914 and the composite lithiated Nafion membrane 970. In some embodiments, the first lithiated Nafion sublayer 916 may be laminated to the anode 914, while in other embodiments, the first lithiated Nafion sublayer 916 may be coupled to the anode 914 using a heat and compress technique, a pressure-distribution sheet technique, or a different technique.

The composite lithiated Nafion membrane 970 may be configured to conduct lithium ions during charging and discharging of the lithium-ion cell 900. First lithium ion pathways in the anode 914 may extend from the composite lithiated Nafion membrane 970 and/or the first lithiated Nafion sublayer 916 to the copper current collector 912. Second lithium ion pathways in the cathode 934 may extend from the composite lithiated Nafion membrane 970 and/or a second lithiated Nafion sublayer 936 to the aluminum current collector 932.

The second assembly 930 may include an aluminum current collector 932, an optional second sublayer 942, a cathode 934, and an optional second lithiated Nafion sublayer 936. The aluminum current collector 932 may be a positive current collector and/or may form a positive terminal of the battery. The aluminum current collector 932 may be disposed adjacent to the second sublayer 942. In some instances, the aluminum current collector 932 may be in contact with the second sublayer 942. The aluminum current collector 932 may form a second end of the lithium-ion cell 900. The aluminum current collector 932 may optionally include one or more surface features 960 that cause a first surface of the aluminum current collector 932 that is in contact with the second sublayer 942 to be a roughened surface. The roughened surface may have an increased surface area relative to other surfaces. Roughened surfaces may be matted and/or corrugated surfaces.

The cathode 934 may be disposed adjacent to the second sublayer 942, such that the second sublayer 942 is between the cathode 934 and the aluminum current collector 932. The cathode 934 may be disposed between the composite lithiated Nafion membrane 970 and the aluminum current collector 932. For example, the cathode 934, the second sublayer 942, and the second lithiated Nafion sublayer 936 may be disposed between the composite lithiated Nafion membrane 970 and the aluminum current collector 932.

The cathode 934 may be formed of lithium cobalt oxide and lithiated Nafion. For example, the cathode 934 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 934, as illustrated in FIG. 3, during charging and discharging of the lithium-ion cell 900. The second lithium ion pathways may extend from the lithiated solid polymer electrolyte Nafion membrane to the aluminum current collector.

The second sublayer 942 may be in contact with the aluminum current collector 932 and the cathode 934. The second sublayer 942 may be formed of PVDF. In some embodiments, the second sublayer 932 may be formed of lithium cobalt oxide and PVDF. For example, the second sublayer 942 may not include Nafion and may therefore form an insulating layer between the aluminum current collector 932 and the cathode 934. In some embodiments, the second sublayer 942 may be laminated to the cathode 934, while in other embodiments, the second sublayer 942 may be coupled to the cathode 934 using a heat and compress technique, a pressure-distribution sheet technique, or a different technique.

The cathode 934 may be coupled to the second sublayer 942. In some embodiments, the cathode 934 may be laminated to the second sublayer 942, while in other embodiments, the cathode 934 may be coupled to the second sublayer 942 using a heat and compress technique, a pressure-distribution sheet technique, or a different technique.

The second lithiated Nafion sublayer 936 may be a layer of lithiated Nafion that is coupled to the cathode 934. The second lithiated Nafion sublayer 936 may increase conductivity between the cathode 934 and the composite lithiated Nafion membrane 970. In some embodiments, the second lithiated Nafion sublayer 936 may increase the number of lithium ion pathways in the cathode 934. The second lithiated Nafion sublayer 936 may be disposed between, and/or optionally in contact with both, the cathode 934 and the composite lithiated Nafion membrane 970. In some embodiments, the second lithiated Nafion sublayer 936 may be laminated to the cathode 934, while in other embodiments, the second lithiated Nafion sublayer 936 may be coupled to the cathode 934 using a heat and compress technique, a pressure-distribution sheet technique, or a different technique.

A first thickness of the first lithiated Nafion sublayer 916 and/or the second lithiated Nafion sublayer 936 may be less than a second thickness of the anode 914 and/or the cathode 934. The first lithiated Nafion sublayer 916 and the second lithiated Nafion sublayer 936 may have equal thicknesses. The first lithiated Nafion sublayer 916 and the second lithiated Nafion sublayer 936 may have a first thickness that is less than or equal to a third thickness of the composite lithiated Nafion membrane 970. The illustrations in FIG. 9 or any other drawings may not be to scale.

The first assembly 910 may be coupled to a first side of the composite lithiated Nafion membrane 970, and the second assembly 930 may be coupled to a second side of the composite lithiated Nafion membrane 970 to form a stack 940. For example, as illustrated in FIG. 9, the stack may include the composite lithiated Nafion membrane 970 disposed between the first lithiated Nafion sublayer 916 and the second lithiated Nafion sublayer 936, as well as between the anode 914 and the cathode 934. The stack may be formed using a pinch roller or other suitable technique. The stack may be placed into a pouch or other package for use in a battery.

Figure 10:
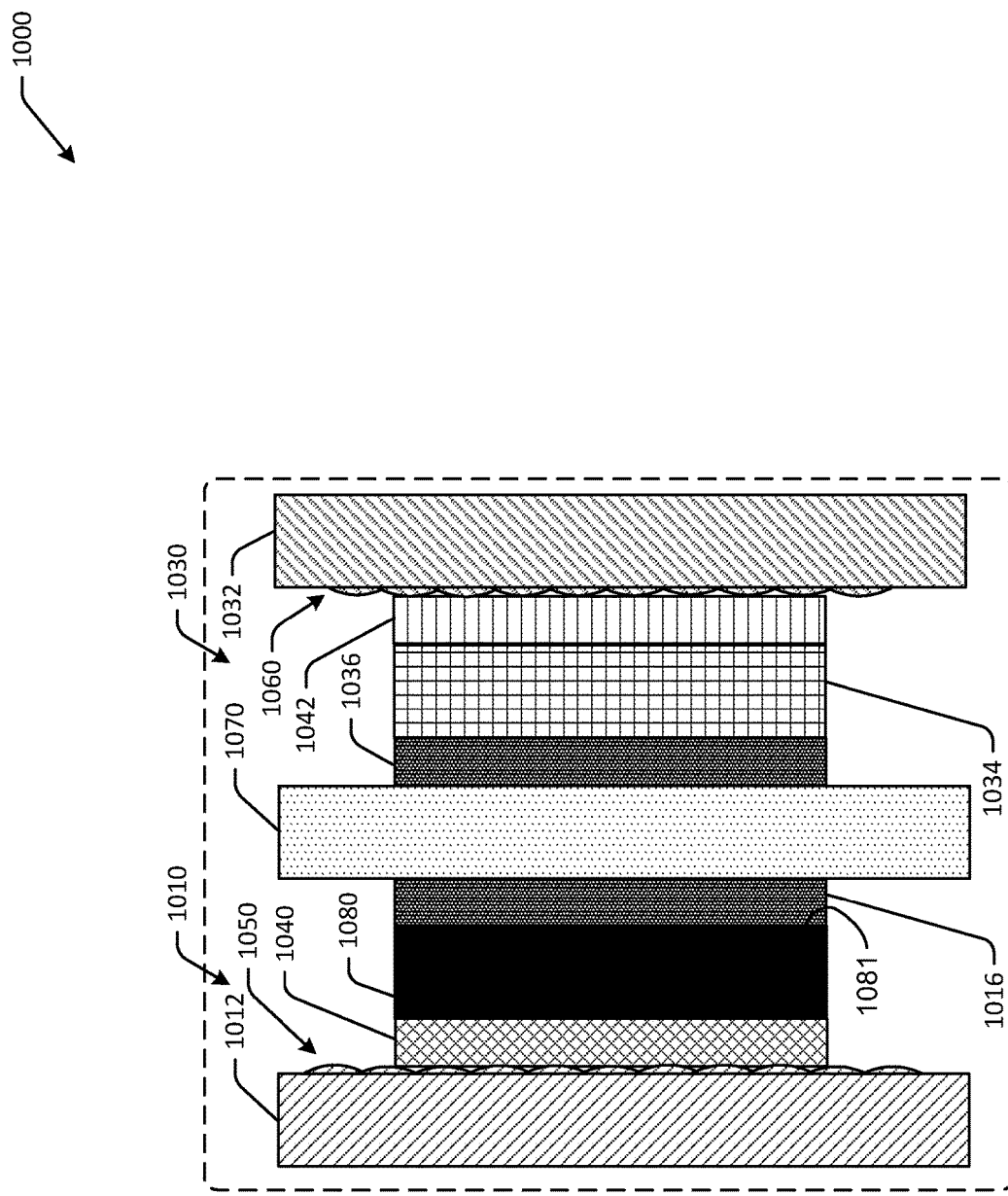
FIG. 10 is a schematic illustration of a cross-sectional view of a lithium-ion cell with a solid electrolyte membrane and a plated lithium Anode current collector in accordance with one or more embodiments of the disclosure.

FIG. 10 is a schematic illustration of a cross-sectional view of a lithium-ion cell 1000 with a solid electrolyte membrane and a plated lithium Anode current collector in accordance with one or more embodiments of the disclosure. Other embodiments may include additional or fewer components.

In FIG. 10, the lithium-ion cell 1000 may include a lithium plated anode current collector that is coupled to a Nafion sublayer, which may then be coupled to a solid polymer electrode separator. The lithium-ion cell 1000 may have a solid polymer electrode separator that may optionally be a composite separator. For example, the composite solid polymer electrode separator may be formed of cheaper porous materials, such as plastic (e.g., polyethylene, PTFE, etc.), and pores in the plastic may be filled with Nafion electrolyte material. The porosity of the base membrane, which may be plastic, may be between about 50% to about 70%, and a thickness of the base membrane may be between about 6 micrometers to about 12 micrometers. Composite membranes may reduce cost, improve the mechanical strength of the separator assembly, and improve the puncture resistance of the separator. The composite solid polymer electrode separator may optionally include inclusions that enhance membrane conductivity and to increase resistance to dendritic puncture. Composite membranes may have relatively less thickness than non-composite members, while maintaining or improving mechanical strength.

The lithium-ion cell 1000 may be part of a lithium-ion battery. For example, a lithium-ion battery may include one or more lithium-ion cells. The lithium-ion cell 1000 may be disposed in a pouch, such as in an interior portion of a flexible or rigid battery pouch, or other suitable package. In some embodiments, the lithium-ion cell 1000 may be part of a lithium-ion pouch battery.

In FIG. 10, the lithium-ion cell 1000 may include a first assembly 1010, an optionally composite (or non-composite) lithiated Nafion membrane 1070, and a second assembly 1030. The composite lithiated Nafion membrane 1070 may be a composite lithiated solid polymer electrolyte Nafion membrane. The composite lithiated Nafion membrane 1070 may be formed of a base membrane having a porosity of between about 50% and about 70%. The base membrane may be a plastic base membrane. The composite lithiated polymer electrolyte membrane 1070 may include between about 30% and about 50% lithiated Nafion, and/or between about 50% to about 70% plastic. The lithium-ion cell 1000 may have a composite lithiated polymer electrolyte membrane 1070 that also optionally includes one or more lithium-based or Zeolite-based inclusions. The inclusions may be formed with any suitable high surface area material, such as Zeolite, and/or suitable lithium containing materials.

The first assembly 1010 may be coupled to a first side of the composite lithiated Nafion membrane 1070, and the second assembly 1030 may be coupled to a second side, or opposite side, of the composite lithiated Nafion membrane 1070. The first assembly 1010 may include more than one component and may be formed or assembled prior to coupling with the composite lithiated Nafion membrane 1070. The second assembly 1030 may similarly include more than one component and may be formed or assembled prior to coupling with the composite lithiated Nafion membrane 1070. In other instances, one or more, or all, components of the lithium-ion cell 1000 may be formed or otherwise assembled at the same time.

The first assembly 1010 may include a copper current collector 1012, an optional first sublayer 1040, an anode 1080, and an optional first lithiated Nafion sublayer 1016. The copper current collector 1012 may be a negative current collector and/or may form a negative terminal of the battery. The copper current collector 1012 may be disposed adjacent to the first sublayer 1040. The first sublayer 1040 may be positioned between the copper current collector 1012 and the anode 1080. The copper current collector 1012 may be in contact with first sublayer 1040. The copper current collector 1012 may form a first end of the lithium-ion cell 1000. The copper current collector 1012 may optionally include one or more surface features 1050 that cause a first surface of the copper current collector 1012 that is in contact with the first sublayer 1040 to be a roughened surface. The roughened surface may have an increased surface area relative to other surfaces. Roughened surfaces may be matted and/or corrugated surfaces.

The anode 1080 may be disposed adjacent to the first sublayer 1040. The anode 1080, the first sublayer 1040, and the first lithiated Nafion sublayer 1016 may be disposed between the composite lithiated Nafion membrane 1070 and the copper current collector 1012. The anode 1080 may include a plated lithium metal surface 1081 in contact with the first lithiated Nafion sublayer 1016. In some embodiments, the anode 1080 may include a plated lithium metal surface that is in contact with the first sublayer 1040. The anode 1080 and the first lithiated Nafion sublayer 1016 may be coupled prior to coupling the assembly to the first lithiated Nafion sublayer 1016 and/or the composite lithiated Nafion membrane 1070. The plated lithium anode 1080 may increase conductivity by about 500-600%.

The first sublayer 1040 may be in contact with the copper current collector 1012 and the anode 1080. The first sublayer 1040 may be formed of PVDF. In some embodiments, the first sublayer 1040 may be formed of graphite and PVDF. For example, the first sublayer 1040 may not include Nafion and may therefore form an insulating layer between the copper current collector 1012 and the anode 1080. In some embodiments, the first sublayer 1040 may be laminated to the anode 1080, while in other embodiments, the first sublayer 1040 may be coupled to the anode 1080 using a heat and compress technique, a pressure-distribution sheet technique, or a different technique.

The anode 1080 may be formed of graphite and lithiated Nafion. For example, the anode 1080 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 1080, as illustrated in FIG. 3, during charging and discharging of the lithium-ion cell 1000.

The first lithiated Nafion sublayer 1016 may be a layer of lithiated Nafion that is coupled to the anode 1080. The first lithiated Nafion sublayer 1016 may increase conductivity between the anode 1080 and the composite lithiated Nafion membrane 1070. In some embodiments, the first lithiated Nafion sublayer 1016 may increase the number of lithium ion pathways in the anode 1080. The first lithiated Nafion sublayer 1016 may be disposed between, and/or optionally in contact with both, the anode 1080 and the composite lithiated Nafion membrane 1070. In some embodiments, the first lithiated Nafion sublayer 1016 may be laminated to the anode 1080, while in other embodiments, the first lithiated Nafion sublayer 1016 may be coupled to the anode 1080 using a heat and compress technique, a pressure-distribution sheet technique, or a different technique.

The composite lithiated Nafion membrane 1070 may be configured to conduct lithium ions during charging and discharging of the lithium-ion cell 1000. First lithium ion pathways in the anode 1080 may extend from the composite lithiated Nafion membrane 1070 and/or the first lithiated Nafion sublayer 1016 to the copper current collector 1012. Second lithium ion pathways in the cathode 1034 may extend from the composite lithiated Nafion membrane 1070 and/or a second lithiated Nafion sublayer 1036 to the aluminum current collector 1032.

The second assembly 1030 may include an aluminum current collector 1032, an optional second sublayer 1042, a cathode 1034, and an optional second lithiated Nafion sublayer 1036. The aluminum current collector 1032 may be a positive current collector and/or may form a positive terminal of the battery. The aluminum current collector 1032 may be disposed adjacent to the second sublayer 1042. In some instances, the aluminum current collector 1032 may be in contact with the second sublayer 1042. The aluminum current collector 1032 may form a second end of the lithium-ion cell 1000. The aluminum current collector 1032 may optionally include one or more surface features 1060 that cause a first surface of the aluminum current collector 1032 that is in contact with the second sublayer 1042 to be a roughened surface. The roughened surface may have an increased surface area relative to other surfaces. Roughened surfaces may be matted and/or corrugated surfaces.

The cathode 1034 may be disposed adjacent to the second sublayer 1042, such that the second sublayer 1042 is between the cathode 1034 and the aluminum current collector 1032. The cathode 1034 may be disposed between the composite lithiated Nafion membrane 1070 and the aluminum current collector 1032. For example, the cathode 1034, the second sublayer 1042, and the second lithiated Nafion sublayer 1036 may be disposed between the composite lithiated Nafion membrane 1070 and the aluminum current collector 1032.

The cathode 1034 may be formed of lithium cobalt oxide and lithiated Nafion. For example, the cathode 1034 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 1034, as illustrated in FIG. 3, during charging and discharging of the lithium-ion cell 1000. The second lithium ion pathways may extend from the lithiated solid polymer electrolyte Nafion membrane to the aluminum current collector.

The second sublayer 1042 may be in contact with the aluminum current collector 1032 and the cathode 1034. The second sublayer 1042 may be formed of PVDF. In some embodiments, the second sublayer 1032 may be formed of lithium cobalt oxide and PVDF. For example, the second sublayer 1042 may not include Nafion and may therefore form an insulating layer between the aluminum current collector 1032 and the cathode 1034. In some embodiments, the second sublayer 1042 may be laminated to the cathode 1034, while in other embodiments, the second sublayer 1042 may be coupled to the cathode 1034 using a heat and compress technique, a pressure-distribution sheet technique, or a different technique.

The cathode 1034 may be coupled to the second sublayer 1042. In some embodiments, the cathode 1034 may be laminated to the second sublayer 1042, while in other embodiments, the cathode 1034 may be coupled to the second sublayer 1042 using a heat and compress technique, a pressure-distribution sheet technique, or a different technique.

The second lithiated Nafion sublayer 1036 may be a layer of lithiated Nafion that is coupled to the cathode 1034. The second lithiated Nafion sublayer 1036 may increase conductivity between the cathode 1034 and the composite lithiated Nafion membrane 1070. In some embodiments, the second lithiated Nafion sublayer 1036 may increase the number of lithium ion pathways in the cathode 1034. The second lithiated Nafion sublayer 1036 may be disposed between, and/or optionally in contact with both, the cathode 1034 and the composite lithiated Nafion membrane 1070. In some embodiments, the second lithiated Nafion sublayer 1036 may be laminated to the cathode 1034, while in other embodiments, the second lithiated Nafion sublayer 1036 may be coupled to the cathode 1034 using a heat and compress technique, a pressure-distribution sheet technique, or a different technique.

A first thickness of the first lithiated Nafion sublayer 1016 and/or the second lithiated Nafion sublayer 1036 may be less than a second thickness of the anode 1080 and/or the cathode 1034. The first lithiated Nafion sublayer 1016 and the second lithiated Nafion sublayer 1036 may have equal thicknesses. The first lithiated Nafion sublayer 1016 and the second lithiated Nafion sublayer 1036 may have a first thickness that is less than or equal to a third thickness of the composite lithiated Nafion membrane 1070. The illustrations in FIG. 10 or any other drawings may not be to scale.

The first assembly 1010 may be coupled to a first side of the composite lithiated Nafion membrane 1070, and the second assembly 1030 may be coupled to a second side of the composite lithiated Nafion membrane 1070 to form a stack 1040. For example, as illustrated in FIG. 10, the stack may include the composite lithiated Nafion membrane 1070 disposed between the first lithiated Nafion sublayer 1016 and the second lithiated Nafion sublayer 1036, as well as between the anode 1080 and the cathode 1034. The stack may be formed using a pinch roller or other suitable technique. The stack may be placed into a pouch or other package for use in a battery.

Figure 11:
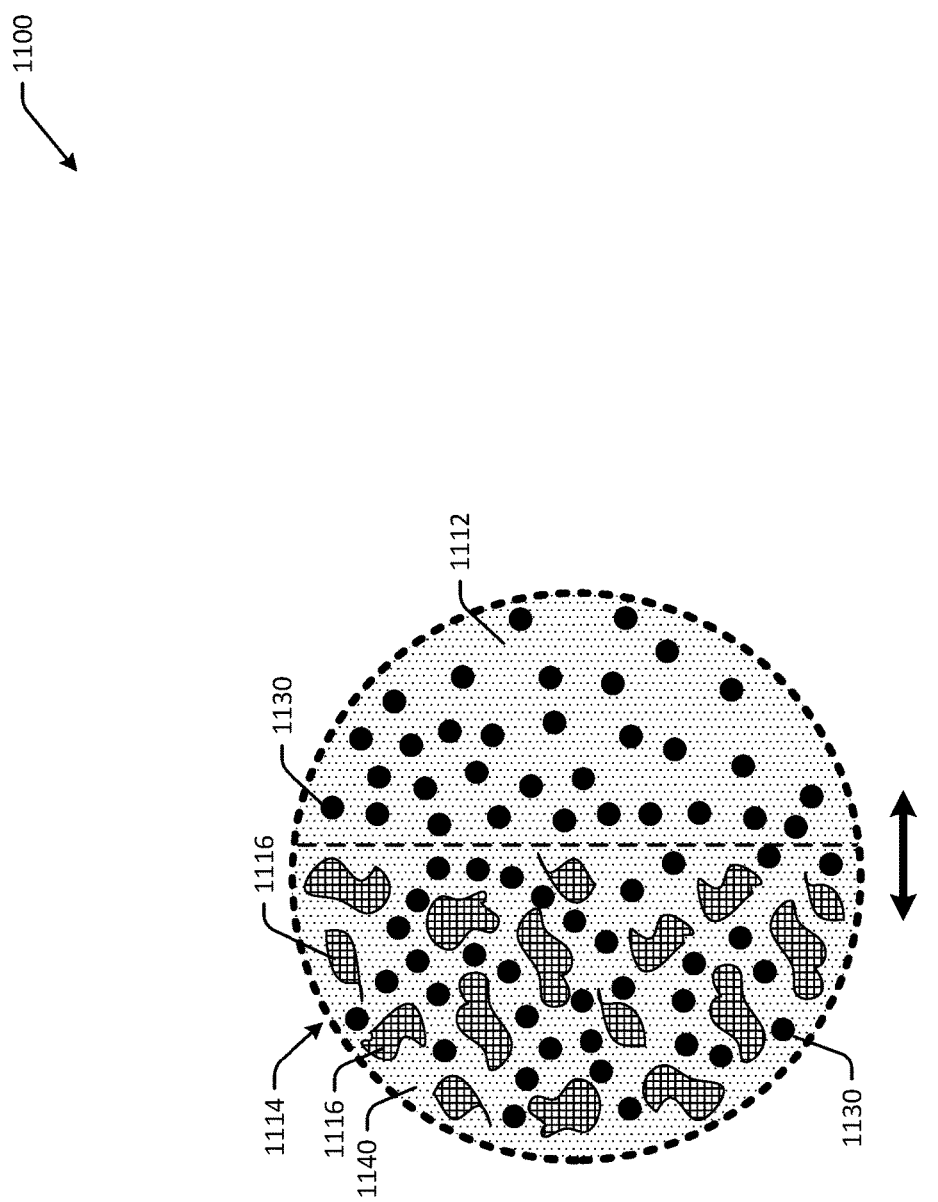
FIG. 11 is a schematic illustration of a cross-sectional view of a portion of a lithium-ion cell with detail views of lithium ion pathways in accordance with one or more embodiments of the disclosure.

FIG. 11 is a schematic illustration of a cross-sectional view of a portion of a lithium-ion cell 1100 with detail views of lithium ion pathways in accordance with one or more embodiments of the disclosure. Other embodiments may include additional or fewer components.

The lithium-ion cell 1100 may include electrode structures with enhanced high power and high charge/discharge rate performance. Electrodes may be split into two layers. The layer closest to the current collector may have no Nafion, and may include electrode material (e.g., anode may have graphite, cathode may have lithium cobalt oxide) with about 5% to about 10% PVDF as binder. The Nafion-containing second layer may have a thickness of between about 1 micrometer and about 2 micrometers, and may have a weight or composition of about 50% to about 90% of Nafion. Such an arrangement may assist with moving the ion transfer (Li+ to Li) location closer to the membrane and help with high charge transfer capability.

In FIG. 11, an anode 1114 is depicted adjacent to, and in contact with, a first side of a lithiated Nafion membrane 1112. The anode 1114 may include graphite that is dispersed in a first lithiated Nafion binder.

In a detail view of an interface between the anode 1114 and the lithiated Nafion membrane 1112, graphite particles 1116 are illustrated as dispersed in a first lithiated Nafion binder 1140. The graphite particles 1116 may be dispersed and held together or bound with the first lithiated Nafion binder 1140. The anode 1114 may have a weight ratio of between about 50% to about 67% graphite, and between about 33% to about 50% lithiated Nafion binder.

The lithiated Nafion binder 1140 may provide first lithium ion pathways in or through the anode 1114 (e.g., between the graphite particles 1116, etc.). However, the first lithium ion pathways may be filled with PVDF material 1130, thereby blocking the flow of lithium ions to the anode current collector during charging and discharging of the lithium-ion cell 1100. Because the lithiated Nafion membrane 1112 also includes Nafion, lithium ions 1130 may pass through the lithium-ion cell 1100, and more particularly between the lithiated Nafion membrane 1112 and the anode 1114, without the use of liquid electrolyte. The cathode may have a similar configuration with an ultrathin cathode (high Nafion and no porosity).

Figure 12:
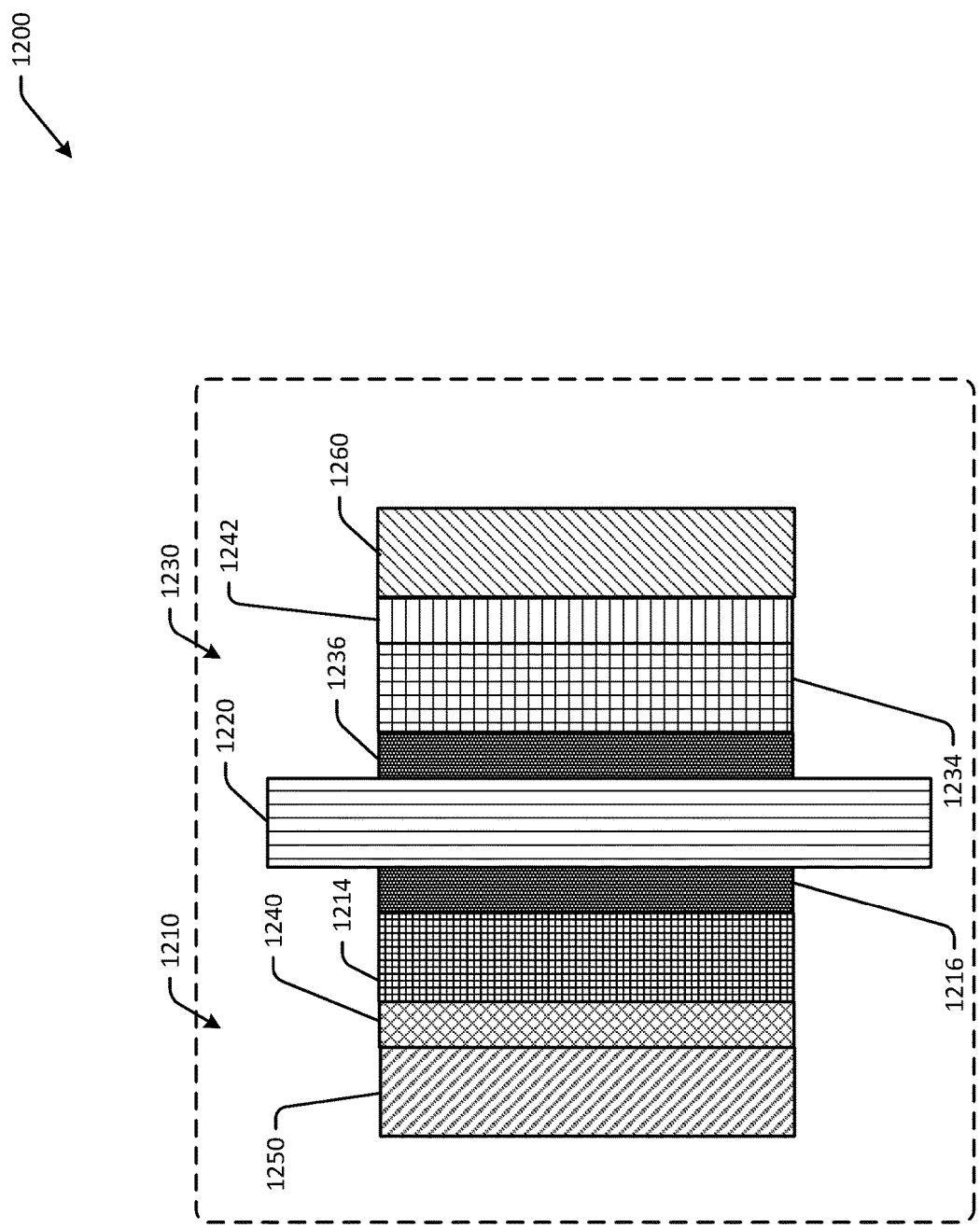
FIG. 12 is a schematic illustration of a cross-sectional view of a lithium-ion cell with a solid electrolyte membrane and mesh current collectors in accordance with one or more embodiments of the disclosure.

FIG. 12 is a schematic illustration of a cross-sectional view of a lithium-ion cell 1200 with a solid electrolyte membrane and mesh current collectors in accordance with one or more embodiments of the disclosure. Other embodiments may include additional or fewer components.

The lithium-ion cell 1200 may include anode and/or cathode electrodes that are cast onto mesh current collectors. For example, the anode may be cast onto a copper mesh, and the cathode may be cast onto an aluminum mesh. The mesh count for either of the copper mesh or the aluminum mesh may range from about 30% open area (e.g., 100×100, etc.) to about 3% open area (e.g., 500×500, etc.). Other mesh counts may be used, such as 200×200, 400×400, and so forth. After the electrodes are cast onto the mesh, the anode and cathode (e.g., the respective electrodes and mesh) may be bonded to a lithiated Nafion membrane 1220. The resulting structure may be referred to as a dry membrane electrode assembly. The dry membrane electrode assembly can then be inserted into a coin cell assembly, filled with a predetermined volume of electrolyte (e.g., ethylene carbonate and dimethyl carbonate with or without lithium-containing salt) to create a wet membrane electrode assembly. The cell package may be crimped to create a coin cell with a wet membrane electrode assembly. The mesh may allow for the Nafion to be made wet with a solvent.

The lithium-ion cell 1200 may have a solid polymer electrolyte that increases battery robustness. The lithium-ion cell 1200 may optionally include a set of sublayers between the electrodes and the current collectors. The sublayers may be formed of PVDF and the respective electrode materials. For example, for the anode, the adjacent sublayer may be formed of graphite and PVDF, and for the cathode, the adjacent sublayer may be formed of lithium cobalt oxide and PVDF. The sublayers may ensure that Nafion in the electrode layers does not interact with the current collector materials. Because Nafion is a superacid, Nafion may corrode the copper and aluminum current collectors. The resulting ionic contaminants can ion-exchange with the Nafion and cause reduction in conductivity, as well as a reduction in capacity. The addition of sublayers may therefore reduce or eliminate all contact. As a result, only electron flow occurs between the sublayers and the current collectors, and all ionic interactions occur in the Nafion sublayer and the electrodes.

The lithium-ion cell 1200 may be part of a lithium-ion battery. For example, a lithium-ion battery may include one or more lithium-ion cells 1200. The lithium-ion cell 1200 may be disposed in a pouch, such as in an interior portion of a flexible or rigid battery pouch, or other suitable package. In some embodiments, the lithium-ion cell 1200 may be part of a lithium-ion pouch battery.

In FIG. 12, the lithium-ion cell 1200 may include a first assembly 1210, a lithiated Nafion membrane 1220, and a second assembly 1230. The lithiated Nafion membrane 1220 may be a lithiated solid polymer electrolyte Nafion membrane. The first assembly 1210 may be coupled to a first side of the lithiated Nafion membrane 1220, and the second assembly 1230 may be coupled to a second side, or opposite side, of the lithiated Nafion membrane 1220. The first assembly 1210 may include more than one component and may be formed or assembled prior to coupling with the lithiated Nafion membrane 1220. The second assembly 1230 may similarly include more than one component and may be formed or assembled prior to coupling with the lithiated Nafion membrane 1220. In other instances, one or more, or all, components of the lithium-ion cell 1200 may be formed or otherwise assembled at the same time.

The first assembly 1210 may include a copper current collector 1212, a first sublayer 1240, an anode 1214, and a first lithiated Nafion sublayer 1216. The copper current collector 1212 may be a negative current collector and/or may form a negative terminal of the battery. The copper current collector 1212 may be disposed adjacent to the first sublayer 1240. The first sublayer 1240 may be positioned between the copper current collector 1212 and the anode 1214. The copper current collector 1212 may be in contact with first sublayer 1240. The copper current collector 1212 may form a first end of the lithium-ion cell 1200. The copper current collector 1212 may be an ultrafine mesh current collector, and may have a mesh count open area between about 3% and about 30%. The electrodes may be cast onto the mesh current collector 1212 to bond to Nafion membrane to form the dry membrane electrode assembly.

The anode 1214 may be disposed adjacent to the first sublayer 1240. The anode 1214, the first sublayer 1240, and the first lithiated Nafion sublayer 1216 may be disposed between the lithiated Nafion membrane 1220 and the copper current collector 1212.

The first sublayer 1240 may be in contact with the copper current collector 1212 and the anode 1214. The first sublayer 1240 may be formed of PVDF. In some embodiments, the first sublayer 1240 may be formed of graphite and PVDF. For example, the first sublayer 1240 may not include Nafion and may therefore form an insulating layer between the copper current collector 1212 and the anode 1214. In some embodiments, the first sublayer 1240 may be laminated to the anode 1214, while in other embodiments, the first sublayer 1240 may be coupled to the anode 1214 using a heat and compress technique, a pressure-distribution sheet technique, or a different technique.

The anode 1214 may be formed of graphite and lithiated Nafion. For example, the anode 1214 may include graphite that is dispersed in a first lithiated Nafion binder, as illustrated in FIG. 3. The lithiated Nafion binder may act as an adhesive or may otherwise be used to form a solid or gel electrode with the graphite. The first lithiated Nafion binder may be configured to provide first lithium ion pathways in the anode 1214, as illustrated in FIG. 3, during charging and discharging of the lithium-ion cell 1200.

The first lithiated Nafion sublayer 1216 may be a layer of lithiated Nafion that is coupled to the anode 1214. The first lithiated Nafion sublayer 1216 may increase conductivity between the anode 1214 and the lithiated Nafion membrane 1220. In some embodiments, the first lithiated Nafion sublayer 1216 may increase the number of lithium ion pathways in the anode 1214. The first lithiated Nafion sublayer 1216 may be disposed between, and/or optionally in contact with both, the anode 1214 and the lithiated Nafion membrane 1220. In some embodiments, the first lithiated Nafion sublayer 1216 may be laminated to the anode 1214, while in other embodiments, the first lithiated Nafion sublayer 1216 may be coupled to the anode 1214 using a heat and compress technique, a pressure-distribution sheet technique, or a different technique.

The lithiated Nafion membrane 1220 may be configured to conduct lithium ions during charging and discharging of the lithium-ion cell 1200. First lithium ion pathways in the anode 1214 may extend from the lithiated Nafion membrane 1220 and/or the first lithiated Nafion sublayer 1216 to the copper current collector 1212. Second lithium ion pathways in the cathode 1234 may extend from the lithiated Nafion membrane 1220 and/or a second lithiated Nafion sublayer 1236 to the aluminum current collector 1232.

The second assembly 1230 may include an aluminum current collector 1232, a second sublayer 1242, a cathode 1234, and a second lithiated Nafion sublayer 1236. The aluminum current collector 1232 may be a positive current collector and/or may form a positive terminal of the battery. The aluminum current collector 1232 may be disposed adjacent to the second sublayer 1242. In some instances, the aluminum current collector 1232 may be in contact with the second sublayer 1242. The aluminum current collector 1232 may form a second end of the lithium-ion cell 1200. The aluminum current collector 1232 may be an ultrafine mesh current collector, and may have a mesh count open area between about 3% and about 30%. The electrodes may be cast onto the mesh current collector 1232 to bond to Nafion membrane to form the dry membrane electrode assembly.

The cathode 1234 may be disposed adjacent to the second sublayer 1242, such that the second sublayer 1242 is between the cathode 1234 and the aluminum current collector 1232. The cathode 1234 may be disposed between the lithiated Nafion membrane 1220 and the aluminum current collector 1232. For example, the cathode 1234, the second sublayer 1242, and the second lithiated Nafion sublayer 1236 may be disposed between the lithiated Nafion membrane 1220 and the aluminum current collector 1232.

The cathode 1234 may be formed of lithium cobalt oxide and lithiated Nafion. For example, the cathode 1234 may include lithium cobalt oxide that is dispersed in a second lithiated Nafion binder, as illustrated in FIG. 3. The lithiated Nafion binder may act as an adhesive or may otherwise be used to form a solid or gel electrode with the lithium cobalt oxide. The second lithiated Nafion binder may be configured to provide second lithium ion pathways in the cathode 1234, as illustrated in FIG. 3, during charging and discharging of the lithium-ion cell 1200. The second lithium ion pathways may extend from the lithiated solid polymer electrolyte Nafion membrane to the aluminum current collector.

The second sublayer 1242 may be in contact with the aluminum current collector 1232 and the cathode 1234. The second sublayer 1242 may be formed of PVDF. In some embodiments, the second sublayer 1232 may be formed of lithium cobalt oxide and PVDF. For example, the second sublayer 1242 may not include Nafion and may therefore form an insulating layer between the aluminum current collector 1232 and the cathode 1234. In some embodiments, the second sublayer 1242 may be laminated to the cathode 1234, while in other embodiments, the second sublayer 1242 may be coupled to the cathode 1234 using a heat and compress technique, a pressure-distribution sheet technique, or a different technique.

The cathode 1234 may be coupled to the second sublayer 1242. In some embodiments, the cathode 1234 may be laminated to the second sublayer 1242, while in other embodiments, the cathode 1234 may be coupled to the second sublayer 1242 using a heat and compress technique, a pressure-distribution sheet technique, or a different technique.

The second lithiated Nafion sublayer 1236 may be a layer of lithiated Nafion that is coupled to the cathode 1234. The second lithiated Nafion sublayer 1236 may increase conductivity between the cathode 1234 and the lithiated Nafion membrane 1220. In some embodiments, the second lithiated Nafion sublayer 1236 may increase the number of lithium ion pathways in the cathode 1234. The second lithiated Nafion sublayer 1236 may be disposed between, and/or optionally in contact with both, the cathode 1234 and the lithiated Nafion membrane 1220. In some embodiments, the second lithiated Nafion sublayer 1236 may be laminated to the cathode 1234, while in other embodiments, the second lithiated Nafion sublayer 1236 may be coupled to the cathode 1234 using a heat and compress technique, a pressure-distribution sheet technique, or a different technique.

A first thickness of the first lithiated Nafion sublayer 1216 and/or the second lithiated Nafion sublayer 1236 may be less than a second thickness of the anode 1214 and/or the cathode 1234. The first lithiated Nafion sublayer 1216 and the second lithiated Nafion sublayer 1236 may have equal thicknesses. The first lithiated Nafion sublayer 1216 and the second lithiated Nafion sublayer 1236 may have a first thickness that is less than or equal to a third thickness of the lithiated Nafion membrane 1220. The illustrations in FIG. 12 or any other drawings may not be to scale.

The first assembly 1210 may be coupled to a first side of the lithiated Nafion membrane 1220, and the second assembly 1230 may be coupled to a second side of the lithiated Nafion membrane 1220 to form a stack 1240. For example, as illustrated in FIG. 12, the stack may include the lithiated Nafion membrane 1220 disposed between the first lithiated Nafion sublayer 1216 and the second lithiated Nafion sublayer 1236, as well as between the anode 1214 and the cathode 1234. The stack may be formed using a pinch roller or other suitable technique. The stack may be placed into a pouch or other package for use in a battery.

The cell 1200 may be placed in a stainless steel coin crimp case. Electrolyte may be imbibed into the electrodes and membrane and the cell may therefore form a wet membrane electrode assembly coin cell.

Figure 13:
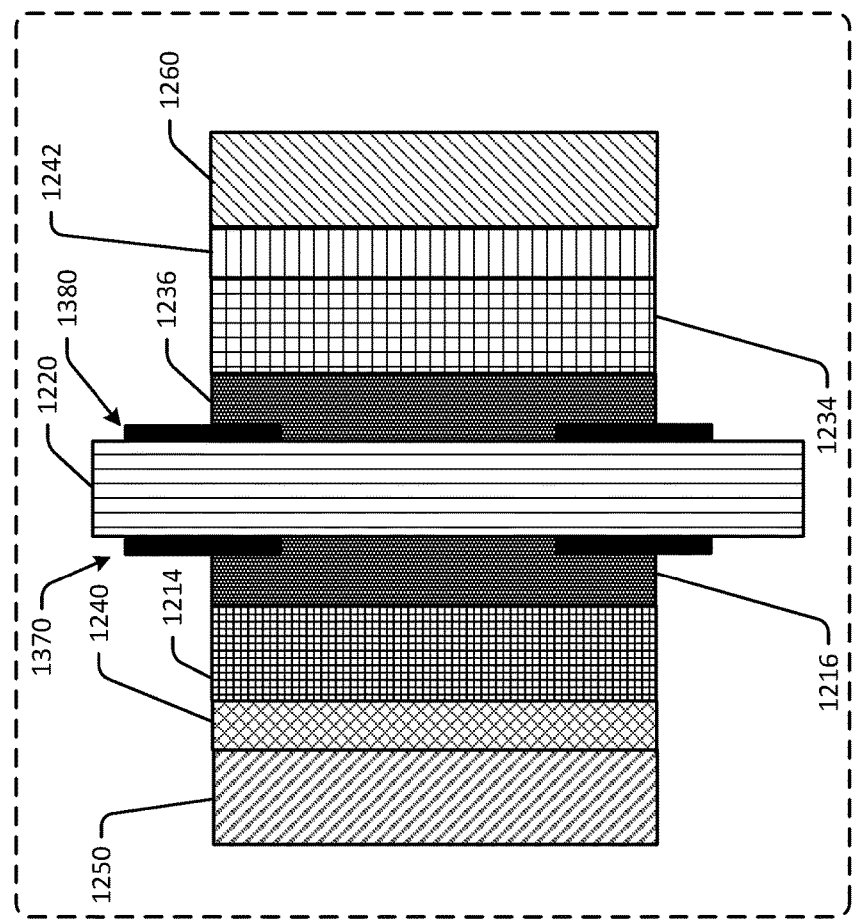
FIG. 13 is a schematic illustration of a cross-sectional view of a lithium-ion cell with a solid electrolyte membrane and an edge protection frame in accordance with one or more embodiments of the disclosure.

FIG. 13 is a schematic illustration of a cross-sectional view of a lithium-ion cell 1300 with a solid electrolyte membrane and an edge protection frame in accordance with one or more embodiments of the disclosure. Other embodiments may include additional or fewer components.

The lithium-ion cell 1300 may be the same cell as the lithium-ion cell 1200 of FIG. 12. However, the lithium-ion cell 1300 may additionally include a first edge protection frame 1370 and a second edge protection frame 1380. The first edge protection frame 1370 may be a first plastic edge protection frame and may be disposed between a lithiated polymer electrolyte membrane 1220 and an anode 1214. The second edge protection frame 1380 may be a second plastic edge protection frame and may be disposed between the lithiated polymer electrolyte membrane 1220 and the cathode 1234.

The first edge protection frame 1370 and the second edge protection frame 1380 may protect the membrane from rupture by the sharp die-cut edge/burrs of the copper current collector 1250 or aluminum current collector 1260. The first edge protection frame 1370 and the second edge protection frame 1380 may be used with a mesh version of current collector or the flat foil. The first edge protection frame 1370 and the second edge protection frame 1380 may each be between about 5 micrometers and about 10 micrometers thick, and may be formed of a plastic material, such as PET, PC, expanded Teflon, or another material. The first edge protection frame 1370 and the second edge protection frame 1380 may be introduced at the dry membrane electrode assembly formation step of the forming process, where the respective frames are placed between the separator membrane 1220 and the electrodes as illustrated. Once the lamination is complete, the assembly may be placed into the coin cell cases, wetted with electrolyte, and crimped to form another embodiment of a wet membrane electrode assembly based coin cell.

One or more operations of the methods, process flows, or use cases of FIGS. 1-13 may have been described above as being performed by a user device, or more specifically, by one or more program module(s), applications, or the like executing on a device. It should be appreciated, however, that any of the operations of the methods, process flows, or use cases of FIGS. 1-13 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-13 may be described in the context of the illustrative devices, it should be appreciated that such operations may be implemented in connection with numerous other device configurations.

The operations described and depicted in the illustrative methods, process flows, or use cases of FIGS. 1-13 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-13 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Example Device Architecture

Figure 14:
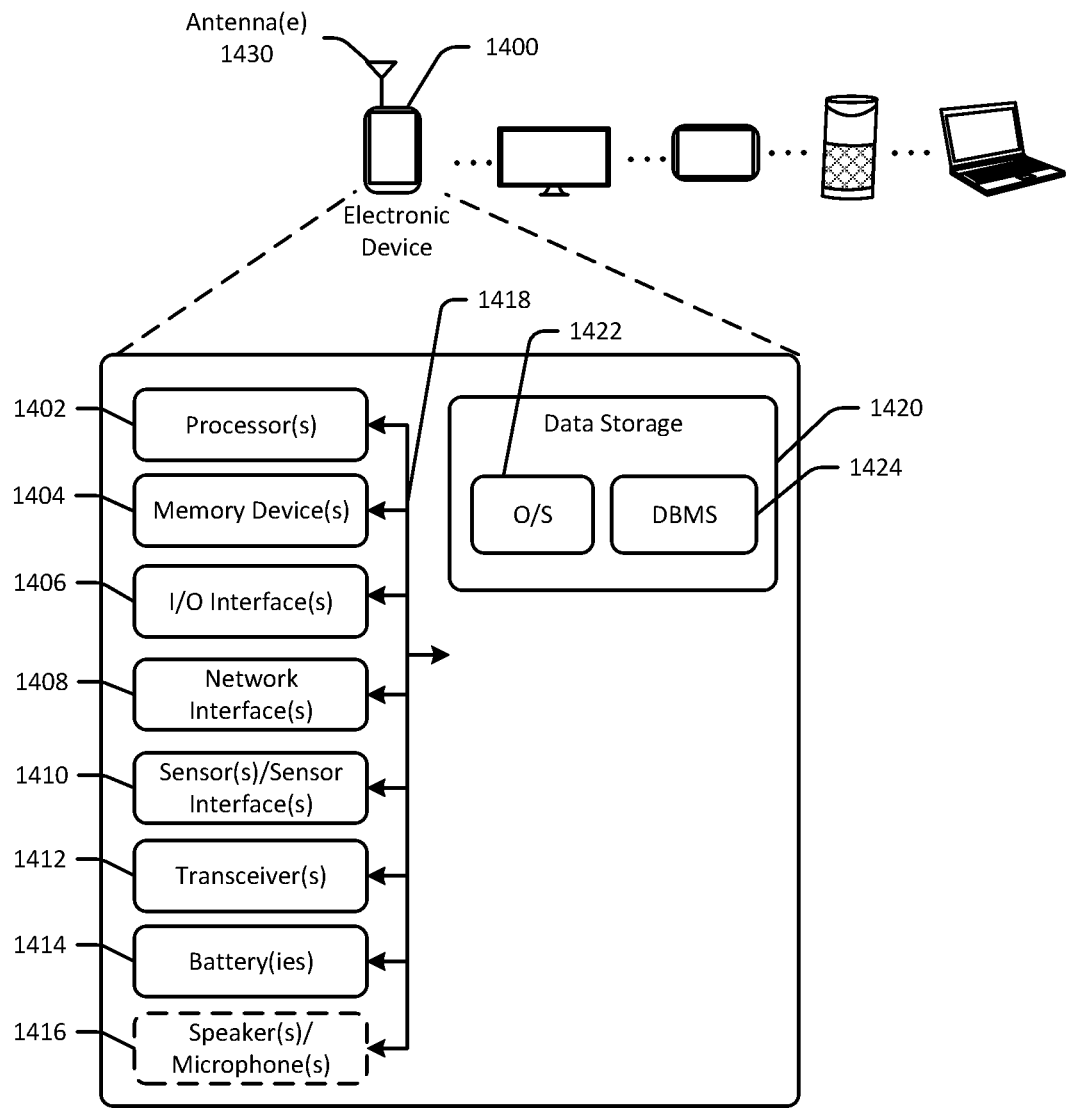
FIG. 14 schematically illustrates an example architecture of an electronic device in accordance with one or more embodiments of the disclosure.

FIG. 14 is a schematic block diagram of one or more illustrative electronic device(s) 1400 in accordance with one or more example embodiments of the disclosure. The electronic device(s) 1400 may include any suitable battery-operated computing device including, but not limited to, a server system, a voice interaction device, a mobile device such as a smartphone, a tablet, an e-reader, a wearable device, or the like; a desktop computer; a laptop computer; a content streaming device; or the like. The electronic device(s) 1400 may correspond to an illustrative device configuration for the device(s) of FIGS. 1-13.

The electronic device(s) 1400 may be configured to communicate with one or more servers, user devices, or the like. The electronic device(s) 1400 may be configured to receive one or more batteries, such as a lithium-ion battery.

The electronic device(s) 1400 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 1400 may include one or more processors (processor(s)) 1402, one or more memory devices 1404 (also referred to herein as memory 1404), one or more input/output (I/O) interface(s) 1406, one or more network interface(s) 1408, one or more sensor(s) or sensor interface(s) 1410, one or more transceiver(s) 1412, one or more battery(ies) 1414, one or more optional microphone(s) 1416, and data storage 1420. The electronic device(s) 1400 may further include one or more bus(es) 1418 that functionally couple various components of the electronic device(s) 1400. The electronic device(s) 1400 may further include one or more antenna(e) 1430 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1418 may include at least one of a system bus, a memory bus, an address bus, or a message bus, and may permit the exchange of information (e.g., data (including computer-executable code), signaling, etc.) between various components of the electronic device(s) 1400. The bus(es) 1418 may include, without limitation, a memory bus or a memory controller, a peripheral bus, an accelerated graphics port, and so forth. The bus(es) 1418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1404 of the electronic device(s) 1400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1420 may include removable storage and/or non-removable storage including, but not limited to, magnetic storage, optical disk storage, and/or tape storage. The data storage 1420 may provide non-volatile storage of computer-executable instructions and other data. The memory 1404 and the data storage 1420, removable and/or non-removable, are examples of computer-readable storage media (CRSM) as that term is used herein.

The data storage 1420 may store computer-executable code, instructions, or the like that may be loadable into the memory 1404 and executable by the processor(s) 1402 to cause the processor(s) 1402 to perform or initiate various operations. The data storage 1420 may additionally store data that may be copied to the memory 1404 for use by the processor(s) 1402 during the execution of the computer-executable instructions. Moreover, output data generated as a result of execution of the computer-executable instructions by the processor(s) 1402 may be stored initially in the memory 1404, and may ultimately be copied to the data storage 1420 for non-volatile storage.

More specifically, the data storage 1420 may store one or more operating systems (O/S) 1422; one or more database management systems (DBMS) 1424; and one or more program module(s), applications, engines, computer-executable code, scripts, or the like. Some or all of these module(s) may be sub-module(s). Any of the components depicted as being stored in the data storage 1420 may include any combination of software, firmware, and/or hardware. The software and/or firmware may include computer-executable code, instructions, or the like that may be loaded into the memory 1404 for execution by one or more of the processor(s) 1402. Any of the components depicted as being stored in the data storage 1420 may support functionality described in reference to corresponding components named earlier in this disclosure.

The data storage 1420 may further store various types of data utilized by the components of the electronic device(s) 1400. Any data stored in the data storage 1420 may be loaded into the memory 1404 for use by the processor(s) 1402 in executing computer-executable code. In addition, any data depicted as being stored in the data storage 1420 may potentially be stored in one or more datastore(s) and may be accessed via the DBMS 1424 and loaded in the memory 1404 for use by the processor(s) 1402 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1402 may be configured to access the memory 1404 and execute the computer-executable instructions loaded therein. For example, the processor(s) 1402 may be configured to execute the computer-executable instructions of the various program module(s), applications, engines, or the like of the electronic device(s) 1400 to cause or facilitate various operations to be performed in accordance with one or more embodiments of the disclosure. The processor(s) 1402 may include any suitable processing unit capable of accepting data as input, processing the input data in accordance with stored computer-executable instructions, and generating output data. The processor(s) 1402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1402 may be capable of supporting any of a variety of instruction sets.

Referring now to other illustrative components depicted as being stored in the data storage 1420, the O/S 1422 may be loaded from the data storage 1420 into the memory 1404 and may provide an interface between other application software executing on the electronic device(s) 1400 and the hardware resources of the electronic device(s) 1400. More specifically, the O/S 1422 may include a set of computer-executable instructions for managing the hardware resources of the electronic device(s) 1400 and for providing common services to other application programs (e.g., managing memory allocation among various application programs). In certain example embodiments, the O/S 1422 may control execution of the other program module(s). The O/S 1422 may include any operating system now known or which may be developed in the future including, but not limited to, any server operating system, any mainframe operating system, or any other proprietary or non-proprietary operating system.

The DBMS 1424 may be loaded into the memory 1404 and may support functionality for accessing, retrieving, storing, and/or manipulating data stored in the memory 1404 and/or data stored in the data storage 1420. The DBMS 1424 may use any of a variety of database models (e.g., relational model, object model, etc.) and may support any of a variety of query languages. The DBMS 1424 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 1400 is a mobile device, the DBMS 1424 may be any suitable lightweight DBMS optimized for performance on a mobile device.

Referring now to other illustrative components of the electronic device(s) 1400, the input/output (I/O) interface(s) 1406 may facilitate the receipt of input information by the electronic device(s) 1400 from one or more I/O devices as well as the output of information from the electronic device(s) 1400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 1400 or may be separate. The I/O devices may further include, for example, any number of peripheral devices such as data storage devices, printing devices, and so forth.

The I/O interface(s) 1406 may also include an interface for an external peripheral device connection such as universal serial bus (USB), FireWire, Thunderbolt, Ethernet port or other connection protocol that may connect to one or more networks. The I/O interface(s) 1406 may also include a connection to one or more of the antenna(e) 1430 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 1400 may further include one or more network interface(s) 1408 via which the electronic device(s) 1400 may communicate with any of a variety of other systems, platforms, networks, devices, and so forth. The network interface(s) 1408 may enable communication, for example, with one or more wireless routers, one or more host servers, one or more web servers, and the like via one or more networks.

The antenna(e) 1430 may include any suitable type of antenna depending, for example, on the communications protocols used to transmit or receive signals via the antenna (e) 1430. Non-limiting examples of suitable antennae may include directional antennae, non-directional antennae, dipole antennae, folded dipole antennae, patch antennae, multiple-input multiple-output (MIMO) antennae, or the like. The antenna(e) 1430 may be communicatively coupled to one or more transceivers 1412 or radio components to which or from which signals may be transmitted or received.

As previously described, the antenna(e) 1430 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1430 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1430 may be configured to transmit or receive radio frequency signals within any suitable frequency range forming part of the unlicensed portion of the radio spectrum.

The antenna(e) 1430 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1412 may include any suitable radio component(s) for—in cooperation with the antenna(e) 1430—transmitting or receiving radio frequency (RF) signals in the bandwidth and/or channels corresponding to the communications protocols utilized by the electronic device(s) 1400 to communicate with other devices. The transceiver(s) 1412 may include hardware, software, and/or firmware for modulating, transmitting, or receiving—potentially in cooperation with any of antenna(e) 1430—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1412 may further include hardware, firmware, or software for receiving GNSS signals. The transceiver(s) 1412 may include any known receiver and baseband suitable for communicating via the communications protocols utilized by the electronic device(s) 1400. The transceiver(s) 1412 may further include a low noise amplifier (LNA), additional signal amplifiers, an analog-to-digital (A/D) converter, one or more buffers, a digital baseband, or the like.

The sensor(s)/sensor interface(s) 1410 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The battery(ies) 1414 may be flexible, and may be any suitable battery type, such as a lithium-ion battery type. The battery(ies) 1414 may be a lithium-ion battery with a solid electrolyte membrane, such as those described in conjunction with FIGS. 1-13. The optional speaker(s)/microphone(s) 1416 may be any device configured to receive analog sound input or voice data.

It should be appreciated that the program module(s), applications, computer-executable instructions, code, or the like depicted in FIG. 14 as being stored in the data storage 1420 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 1400, and/or hosted on other computing device(s) accessible via one or more networks, may be provided to support functionality provided by the program module(s), applications, or computer-executable code depicted in FIG. 14 and/or additional or alternate functionality. Further, functionality may be modularized differently such that processing described as being supported collectively by the collection of program module(s) depicted in FIG. 14 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 14 may be implemented, at least partially, in hardware and/or firmware across any number of devices.

It should further be appreciated that the electronic device(s) 1400 may include alternate and/or additional hardware, software, or firmware components beyond those described or depicted without departing from the scope of the disclosure. More particularly, it should be appreciated that software, firmware, or hardware components depicted as forming part of the electronic device(s) 1400 are merely illustrative and that some components may not be present or additional components may be provided in various embodiments. While various illustrative program module(s) have been depicted and described as software module(s) stored in the data storage 1420, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-13 may be performed by a device having the illustrative configuration depicted in FIG. 14, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-13 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-13 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A battery cell comprising:
a copper current collector, wherein the copper current collector is a negative current collector;
a first layer in contact with the copper current collector;
an anode comprising a plated lithium metal surface and a first lithiated polymer binder configured to conduct lithium ions, wherein the first layer is disposed between the copper current collector and the anode;
a cathode comprising a second lithiated polymer binder configured to conduct lithium ions;
a lithiated polymer electrolyte membrane disposed between the anode and the cathode;
a second layer in contact with the cathode;
an aluminum current collector disposed adjacent to the second layer, wherein the aluminum current collector is a positive current collector, and wherein the second layer is disposed between the aluminum current collector and the cathode; and
a lithiated layer disposed between the plated lithium metal surface of the anode and the lithiated polymer electrolyte membrane, the lithiated layer comprising a lithiated sulfonated tetrafluoroethylene based fluoropolymer-copolymer;
wherein the lithiated layer is in contact with the plated lithium metal surface of the anode.

2. The battery cell of claim 1, wherein the first layer comprises polyvinylidene fluoride, and wherein the second layer comprises polyvinylidene fluoride.

3. The battery cell of claim 2, wherein the first layer further comprises graphite, and wherein the second layer further comprises lithium cobalt oxide.

4. The battery cell of claim 1, wherein the lithiated polymer electrolyte membrane comprises a base membrane having a porosity of between about 50% and about 70%.

5. The battery cell of claim 4, wherein the lithiated polymer electrolyte membrane comprises between about 30% and about 50% of the lithiated sulfonated tetrafluoroethylene based fluoropolymer-copolymer, and between about 50% to about 70% plastic.

6. The battery cell of claim 4, wherein the lithiated polymer electrolyte membrane further comprises lithium-based or Zeolite-based inclusions.

7. The battery cell of claim 1, wherein the lithiated layer is a first lithiated layer, wherein the battery cell further comprises a second lithiated layer disposed between the cathode and lithiated polymer electrolyte membrane, and
wherein the second lithiated layer comprises the lithiated sulfonated tetrafluoroethylene based fluoropolymer-copolymer.

8. The battery cell of claim 1, wherein the copper current collector is a mesh copper current collector having a mesh count open area between about 3% and about 30%, and wherein the aluminum current collector is a mesh aluminum current collector having a mesh count open area between about 3% and about 30%.

9. The battery cell of claim 1, further comprising:
a first plastic edge protection frame disposed between the lithiated polymer electrolyte membrane and the anode; and
a second plastic edge protection frame disposed between the lithiated polymer electrolyte membrane and the cathode.

10. The battery cell of claim 1, wherein the anode further comprises graphite that is dispersed in the first lithiated polymer binder, and wherein the first lithiated polymer binder provides first pathways for lithium ions to flow; and
wherein the cathode further comprises lithium cobalt oxide that is dispersed in the second lithiated polymer binder, and wherein the second lithiated polymer binder provides second pathways for lithium ions to flow.

11. A device comprising:
a flexible battery comprising:
a copper current collector, wherein the copper current collector is a negative current collector;
a first layer in contact with the copper current collector;
an anode comprising a plated lithium metal surface and a first lithiated polymer binder configured to conduct lithium ions, wherein the first layer is disposed between the copper current collector and the anode;
a cathode comprising a second lithiated polymer binder configured to conduct lithium ions;
a lithiated polymer electrolyte membrane disposed between the anode and the cathode;
a second layer in contact with the cathode;
an aluminum current collector disposed adjacent to the second layer, wherein the aluminum current collector is a positive current collector, and wherein the second layer is disposed between the aluminum current collector and the cathode; and
a lithiated layer disposed between the plated lithium metal surface of the anode and the lithiated polymer electrolyte membrane, the lithiated layer comprising a lithiated sulfonated tetrafluoroethylene based fluoropolymer-copolymer;
wherein the lithiated layer is in contact with the plated lithium metal surface of the anode.

12. The device of claim 11, wherein the first layer comprises polyvinylidene fluoride, and wherein the second layer comprises polyvinylidene fluoride.

13. The device of claim 12, wherein the first layer further comprises graphite, and wherein the second layer further comprises lithium cobalt oxide.

14. The device of claim 11, wherein the lithiated polymer electrolyte membrane comprises a base membrane having a porosity of between about 50% and about 70%.

15. The battery cell of claim 14, wherein the lithiated polymer electrolyte membrane comprises between about 30% and about 50% of the lithiated sulfonated tetrafluoroethylene based fluoropolymer-copolymer, and between about 50% to about 70% plastic.

16. The device of claim 14, wherein the lithiated polymer electrolyte membrane further comprises lithium-based or Zeolite-based inclusions.

17. The device of claim 11, wherein the lithiated layer is a first lithiated layer, wherein the battery cell further comprises a second lithiated layer disposed between the cathode and lithiated polymer electrolyte membrane, and
wherein the second lithiated layer comprises the lithiated sulfonated tetrafluoroethylene based fluoropolymer-copolymer.

18. The device of claim 11, wherein the copper current collector is a mesh copper current collector having a mesh count open area between about 3% and about 30%, and wherein the aluminum current collector is a mesh aluminum current collector having a mesh count open area between about 3% and about 30%.

19. The device of claim 11, further comprising:
a first plastic edge protection frame disposed between the lithiated polymer electrolyte membrane and the anode; and
a second plastic edge protection frame disposed between the lithiated polymer electrolyte membrane and the cathode.

* * * * *